(12) United States Patent
Jang et al.

(10) Patent No.: US 10,732,437 B2
(45) Date of Patent: Aug. 4, 2020

(54) HIGHLY SCATTERING METASURFACE PHASE MASKS FOR COMPLEX WAVEFRONT ENGINEERING

(71) Applicant: California Institute of Technology, Pasadena, CA (US)

(72) Inventors: Mooseok Jang, Seoul (KR); Yu Horie, Pasadena, CA (US); Atsushi Shibukawa, Pasadena, CA (US); Andrei Faraon, La Canada Flintridge, CA (US); Changhuei Yang, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 155 days.

(21) Appl. No.: 15/957,541

(22) Filed: Apr. 19, 2018

(65) Prior Publication Data

US 2019/0113775 A1    Apr. 18, 2019

Related U.S. Application Data

(60) Provisional application No. 62/521,702, filed on Jun. 19, 2017, provisional application No. 62/487,367, filed on Apr. 19, 2017.

(51) Int. Cl.
*G02F 1/01*      (2006.01)
*G02B 5/00*      (2006.01)
(Continued)

(52) U.S. Cl.
CPC ............ *G02F 1/0102* (2013.01); *G02B 1/00* (2013.01); *G02B 1/002* (2013.01); *G02B 5/00* (2013.01);
(Continued)

(58) Field of Classification Search
CPC ........ G02B 1/002; G02B 5/0236; G02B 1/00; G02B 5/00
See application file for complete search history.

(56) References Cited

U.S. PATENT DOCUMENTS

| 2015/0002844 | A1* | 1/2015 | Park ............... | G01N 21/49 356/338 |
| 2016/0025914 | A1* | 1/2016 | Brongersma ......... | G02B 1/002 359/489.07 |
| 2016/0156090 | A1 | 6/2016 | Campione et al. | |

FOREIGN PATENT DOCUMENTS

| WO | 2016/108990 A2 | 7/2016 | |
| WO | WO 2016108990 A2 * | 7/2016 | ............... G02B 6/27 |

(Continued)

OTHER PUBLICATIONS

Ambrose, E.J. "A Surface Contact Microscope for the study of Cell Movements" Nature, Nature Publishing Group. Nov. 24, 1956. vol. 178. pp. 1194. 1 page.

(Continued)

*Primary Examiner* — Joseph P Martinez
(74) *Attorney, Agent, or Firm* — Steinfl + Bruno LLP

(57) ABSTRACT

Complex wavefront engineering is realized through a random metasurface phase mask backed by a phase-only spatial light modulator. The metasurface consists of an array of subwavelength nanoscatterers which give the metasurface a pre-arranged disorder. Since the transmission matrix of the disordered metasurface is known, there is no need for extensive characterization measurements which are instead required in standard disordered optical devices.

19 Claims, 23 Drawing Sheets

(51) Int. Cl.
G02B 1/00 (2006.01)
G02B 5/02 (2006.01)
(52) U.S. Cl.
CPC ........ *G02B 5/0236* (2013.01); *G02F 2202/10* (2013.01); *G02F 2202/36* (2013.01); *G02F 2203/12* (2013.01); *G02F 2203/50* (2013.01)

(56) References Cited

FOREIGN PATENT DOCUMENTS

| | | |
|---|---|---|
| WO | 2016/108990 A3 | 9/2016 |
| WO | 2016/168173 A1 | 10/2016 |
| WO | 2018/195309 A1 | 10/2018 |

OTHER PUBLICATIONS

Arbabi et al. "Dielectric metasurfaces for complete control of phase and polarization with subwavelength spatial resolution and high transmission" *Nature—Nanotechnology, Macmillan Publishers Ltd.* Aug. 2015. vol. 10. pp. 937-943. 9 pages.
Arbabi et al. "Miniature optical planar camera based on a wide-angle metasurface doublet corrected for monochromatic aberrations" *Nature—Communications, Macmillan Publishers Ltd.* Nov. 28, 2016. vol. 7. pp. 1-9. 9 pages.
Arbabi et al. "Multiwavelength polarization-insensitive lenses based on dielectric metasurfaces with meta-molecules" *Optica, Optical Society of America*. Jun. 2016. vol. 3, No. 6. pp. 628-633. 6 pages.
Arbabi et al. "Subwavelength-thick lenses with high numerical apertures and large efficiency based on high-contrast transmitarrays" *Nature—Communications, Macmillan Publishers Ltd.* May 7, 2015. vol. 6. pp. 1-6. 6 pages.
Backlund et al. "Removing Orientation-Induced Localization Biases in Single-Molecule Microscopy Using a Broadband Metasurface Mase" *Nature—Photonics, Nature Publishing Group*. Nov. 2016. vol. 10. pp. 459-462. 14 pages.
Bertolotti et al. "Non-invasive imaging through opaque scattering layers" *Nature, Macmillan Publishers Ltd.* Nov. 8, 2012. vol. 491. pp. 232-234. 3 pages.
Boniface et al. "Transmission-matrix-based point-spread-function engineering through a complex medium" *Optica, Optical Society of America*. Jan. 2017. vol. 4, No. 1. pp. 54-59. 6 pages.
Bruck et al. "All-optical spatial light modulator for reconfigurable silicon photonic circuits" *Optica, Optical Society of America*. Apr. 2016. vol. 3, No. 4. pp. 396-402. 7 pages.
Choi et al. "Optical Imaging With the Use of a Scattering Lens" *IEEE Journal of Selected Topics in Quantum Electronics, Institute of Electrical and Electronic Engineers*. Mar. 2014. vol. 20, No. 2. 13 pages.
Choi et al., "Overcoming the Diffraction Limit Using Multiple Light Scattering in a Highly Disordered Medium" *Physical Review Letter*. Jul. 2011. vol. 107, No. 2. pp. 1-9. 9 pages.
Curtis et al. "Dynamic holographic optical tweezers" *Optics Communications, Elsevier Science B.V.* Jun. 15, 2002. vol. 207. pp. 169-175. 8 pages.
Vellekoop et al. "Exploiting disorder for perfect focusing" *Nature—Photonics, Macmillan Publishers Ltd.* Feb. 2010. vol. 4. pp. 320-322. 3 pages.
Fattal et al. "Flat dielectric grating reflectors with focusing abilities" *Nature—Photonics, Macmillan Publishers Ltd.* May 2010. vol. 4. pp. 466-470. 5 pages.
Feng et al. "Correlations and Fluctuations of Coherent Wave Transmission through Disordered Media" *Physical Review Letters, The American Physical Society*. Aug. 15, 1988. vol. 61, No. 7. pp. 834-837. 4 pages.
Genevet et al. "Recent advances in planar optics: from plasmonic to dielectric metasurfaces" *Optica, Optical Society of America*. Jan. 2017. vol. 4, No. 1. pp. 139-152. 14 pages.

Ho et al. "Planar immersion lens with metasurfaces" *Physical Review B, American Physical Society*. Mar. 2015. vol. 91. pp. 125145.1-125145.8. 8 pages.
Horstmeyer et al. "Guidestar-assisted-wavefront-shaping methods for focusing light into biological tissue" *Nature—Photonics, Macmillan Publishers Ltd.* Aug. 2015. vol. 9. pp. 563-571. 9 pages.
International Search Report for International Application No. PCT/US2018/028359 filed Apr. 19, 2018 on behalf of California Institute of Technology. dated Jul. 31, 2018. 3 pages.
Katz et al. "Non-invasive single-shot imaging through scattering layers and around corners via speckle correlations" *Nature—Photonics, Macmillan Publishers Ltd.* Aug. 2014. vol. 8. pp. 784-790. 8 pages.
Khorasaninejad et al. "Metalenses at visible wavelengths: Diffraction-limited focusing and subwavelength resolution imaging" *Science, American Association for the Advancement of Science*. Jun. 3, 2016. vol. 352, No. 6290. pp. 1190-1194. 6 pages.
Kim et al. "Integration of optogenetics with complementary methodologies in systems neuroscience" *Nature Reviews Neuroscience, Nature Publishing Group*. Mar. 17, 2017. vol. 18, No. 4. pp. 222-235. 29 pages.
Kim et al. "Transmission matrix of a scattering medium and its applications in biophotonics" *Optics Express, Optic Society of America*. May 2015. vol. 23, No. 10. 21 pages.
Li et al. "Extended-resolution structured illumination imaging of endocytic and cytoskeletal dynamics" *Science, American Association for the Advancement of Science*. Aug. 28, 2015. vol. 349, No. 6251. 26 pages.
Lin et al. "Dielectric gradient metasurface optical elements" *Science, American Association for the Advancement of Science*. Jul. 18, 2014. vol. 345, No. 6194. pp. 298-302. 6 pages.
Lohmann et al. "Space-bandwidth product of optical signals and systems" *Journal of the Optical Society of America A, Optical Society of America*. Mar. 1996. vol. 13, No. 3. pp. 470-473. 4 pages.
Miller, David A. B. "All linear optical devices are mode converters" *Optics Express, Optical Society of America*. Oct. 2012. vol. 20, No. 21. 9 pages.
Miller, David A. B. "Sorting out light—Controlled interference can separate overlapping light beams for a device functionality" *Science, American Association for the Advancement of Science*. Mar. 27, 2015. vol. 347, No. 6229. pp. 1423-1424. 3 pages.
Mosk et al. "Controlling waves in space and time for imaging and focusing in complex media" *Nature—Photonics, Macmillan Publishers Ltd.* May 2012. vol. 6. pp. 283-292. 10 pages.
Mudry et al. "Structured illumination microscopy using unknown speckle patterns" *Nature—Photonics, Macmillan Publishers Ltd.* Apr. 2012. vol. 6. pp. 312-315. 5 pages.
Nikolenko et al. "SLM microscopy: scanless two-photon imaging and photostimulation with spatial light modulators" *Frontiers in Neural Circuits, Frontiers Media S.A.* Dec. 2008. vol. 2, No. 5. pp. 1-14. 14 pages.
Pappu et al. "Physical One-Way Functions" *Science, American Association for the Advancement of Science*. Sep. 20, 2002. vol. 297, No. 5589. pp. 2026-2030. 6 pages.
Park et al. "Focusing through turbid media by polarization modulation" *Optics Letters, Optical Society of America*. Apr. 2015. vol. 40, No. 8. pp. 1667-1670. 4 pages.
Park et al. "Subwavelength light focusing using random nanoparticles" *Nature Photonics, Macmillan Publishers Ltd.* Apr. 2013. vol. 7. pp. 454-458. 6 pages.
Popoff et al. "Controlling light through optical disordered media: transmission matrix approach" *New Journal of Physics, Institute of Physics Publishing*. Dec. 2011. vol. 13. pp. 1-26. 27 pages.
Popoff et al. "Measuring the Transmission Matrix in Optics: An Approach to the Study and Control of Light Propagation in Disordered Media" *Physical Review Letters, The American Physical Society*. Mar. 2010. vol. 104, No. 100601. pp. 1-4. 4 pages.
Putten et al. "Scattering Lens Resolves Sub-100 nm Structures with Visible Light" *Physical Review Letters, American Physical Society*. May 2011. vol. 106, No. 193905. pp. 1-4. 4 pages.
Redding et al. "Compact spectrometer based on a disordered photonic chip" *Nature—Photonics, Macmillan Publishers Ltd.* Jul. 2013. vol. 7. pp. 746-751. 6 pages.

(56) References Cited

OTHER PUBLICATIONS

Ryu et al. "Optical phase conjugation assisted scattering lens: variable focusing and 3D patterning" *Scientific Reports*. Apr. 2016. vol. 6. pp. 1-8. 8 pages.

Schott et al. "Characterization of the angular memory effect of scattered light in biological tissues" *Optics Express, Optical Society of America*. May 2015. vol. 23, No. 10. 12 pages.

Tyson, Robert K. "Principles of Adaptive Optics 3rd Edition—Ch. 6—Wavefront Correction" *CRC Press*.2010. pp. 177-196. 21 pages.

Vellekoop et al. "Scattered light fluorescence microscopy: imaging through turbid layers" *Optics Letters, Optical Society of America*. Apr. 15, 2010. vol. 35, No. 8. pp. 1245-1247. 3 pages.

Vellekoop et al. "Focusing coherent light through opaque strongly scattering media" *Optics Letters, Optical Society of America*. Aug. 2007. vol. 32, No. 16. pp. 2309-2311. 3 pages.

Vo et al. "Sub-Wavelength Grating Lenses With a Twist" *IEEE Photonics Technology Letters, Institute of Electrical and Electronics Engineers*. Jul. 1, 2014. vol. 26, No. 13. pp. 1375-1378. 5 pages.

Written Opinion for International Application No. PCT/US2018/028359 filed Apr. 19, 2018 on behalf of California Institute of Technology. dated Jul. 31, 2018. 8 pages.

Yaqoob et al. "Optical Phase Conjugation for Turbidity Suppression in Biological Samples" *Nature—Photonics, Macmillan Publishers Ltd*. 2008. vol. 2, No. 2. pp. 110-115. 16 pages.

Yoon et al. "Measuring optical transmission matrices by wavefront shaping" *Optics Express, Optical Society of America*. Apr. 2015. vol. 23, No. 8. 10 pages.

Yu et al. "Flat optics with designer metasurface" *Nature—Materials, Macmillan Publishers Ltd*. Jan. 2014. vol. 13. pp. 139-150. 12 pages.

Yu et al. "Ultrahigh-definition dynamic 3D holographic display by active control of volume speckle fields" *Nature—Photonics, Macmillan Publishers Ltd*. Jan. 2017. vol. 11. pp. 186-192. 8 pages.

Zhan et al. "Low-Contrast Dielectric Metasurface Optics" *ACS—Photonics, American Chemical Society*. Feb. 2016. vol. 3. pp. 209-214. 6 pages.

International Preliminary Report on Patentability for International Application No. PCT/US2018/028359 filed Apr. 19, 2018 on behalf of California Institute of Technology. dated Oct. 22, 2019. 9 Pages.

\* cited by examiner

HIGHLY SCATTERING METASURFACE PHASE MASKS FOR COMPLEX WAVEFRONT ENGINEERING

CROSS REFERENCE TO RELATED APPLICATIONS

The present application claims priority to U.S. Provisional Patent Application No. 62/487,367, filed on Apr. 19, 2017, and U.S. Provisional Patent Application No. 62/521,702, filed on Jun. 19, 2017, the disclosures of both being incorporated herein by reference in their entirety.

STATEMENT OF INTEREST

This invention was made with government support under Grant No(s). OD007307 & NS090577 awarded by the National Institutes of Health and Grant No. CBET1512266 awarded by the National Science Foundation. The government has certain rights in the invention.

TECHNICAL FIELD

The present disclosure relates to optical metasurfaces. More particularly, it relates to highly scattering metasurface phase masks for complex wavefront engineering.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
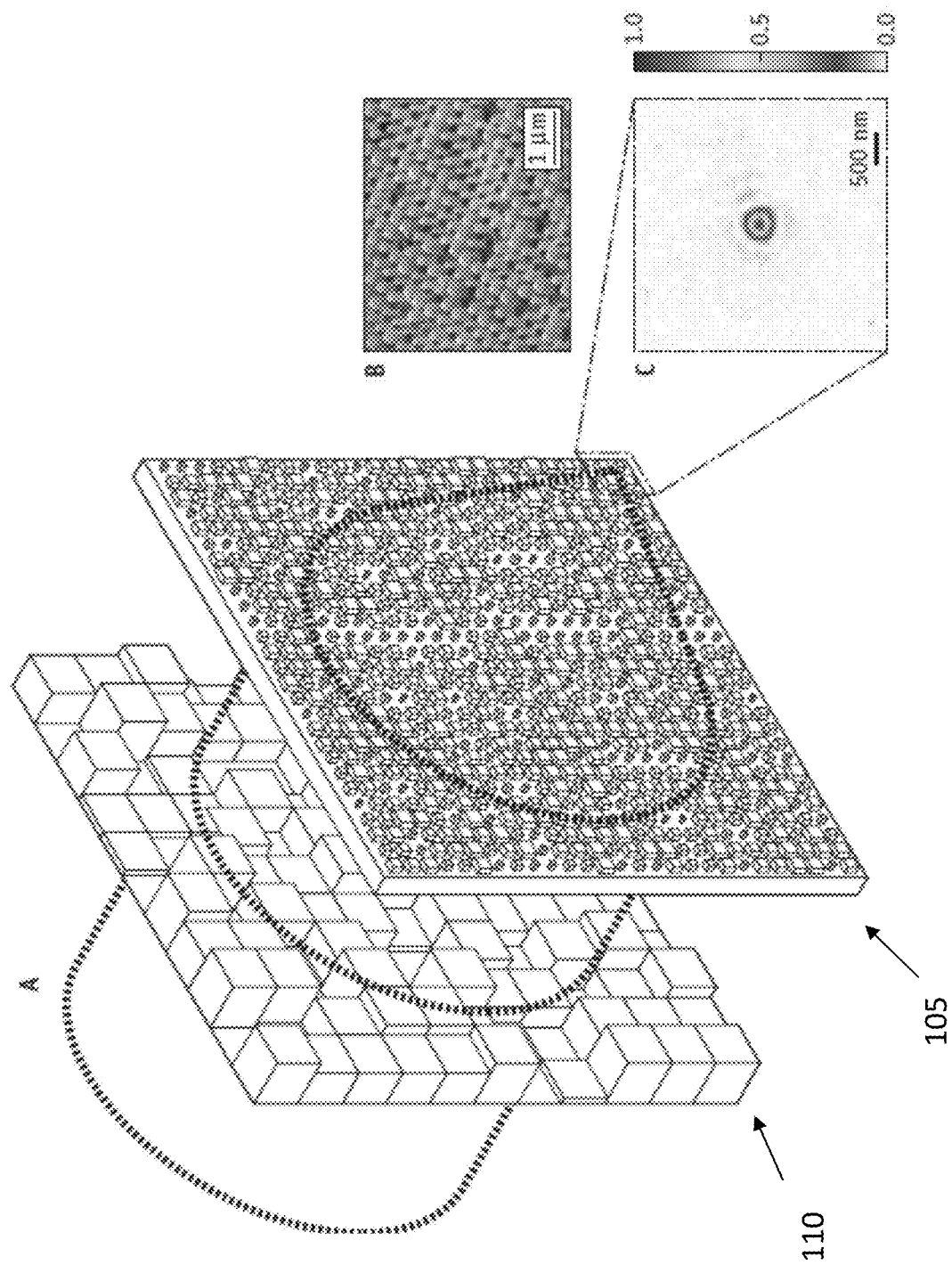
FIG. 1 illustrates an example of complex wavefront engineering through a random metasurface.

In a first aspect of the disclosure, a structure is described, the structure comprising: a spatial light modulator; and a disordered metasurface comprising an array of scattering elements, each scattering element of the array having a width smaller than a wavelength of an incident electromagnetic wave at which the structure is designed to operate.

In a second aspect of the disclosure, a method is described, the method comprising: randomly arranging on a substrate an array of dielectric scattering elements having a varying width, the varying width chosen according to a desired transmission matrix, thereby fabricating a disordered metasurface; and arranging a spatial light modulator co-planarly to the disordered metasurface.

DETAILED DESCRIPTION

The present disclosure discloses highly scattering optical metasurfaces with reference to complex wavefront engineering. In particular, complex wavefront engineering in combination with random media has demonstrated optical manipulation capabilities beyond the dictates of conventional optics. These capabilities include: 1. the ability to focus aberration-free light, or electromagnetic waves, over a greatly extended volume; and 2. subwavelength focusing through coupling of evanescent-to-propagative scattering mediation. A challenge for translating these capabilities to useful application remains—the random medium or its input-output properties, as known to the person of ordinary skill in the art, would need to be exhaustively characterized prior to any use. Therefore, to access and manipulate N independent optical modes, O(N) measurements would need to be made. The present disclosure describes methods and devices that obviate the above requirements, by replacing the random medium with an engineered disordered medium where the 'randomness' is specifically designed, and for which its exact characteristics are known without prior characterization. In this context, the metasurface phase masks described in the present disclosure are an excellent candidate as an engineered-disorder medium. The present disclosure describes how the phase profile of the metasurface can be designed to efficiently scatter the incident light in all possible outgoing directions.

A metasurface having the properties described above, when used in complex wavefront engineering (or wavefront shaping), provides the ability to access, for example, more than 109 optical modes with only O(1) measurements. In other words, more than 109 diffraction-limited focus points can be created in a 2D plane. Such a surface can exhibit an extraordinarily wide angular optical memory effect range, excellent stability, and a tailorable angular scattering profile—properties that are prominently missing in conventional random media used with complex wavefront engineering today. Furthermore, unprecedented characteristics of the proposed metasurface such as additional degrees of freedom for polarization and high spectral correlation range can expand the scope of applications of complex wavefront engineering. For example, the advantages mentioned above can be exploited to implement a scattering lens microscope that can perform focusing onto ~109 points with a diffraction-limited performance in a field of view of close to a centimeter.

FIG. 1 illustrates an example of complex wavefront engineering through a random metasurface phase mask (105) backed with a phase-only spatial light modulator (SLM, 110). Panel a illustrates a schematic of an optical focusing system using a random metasurface backed with an SLM. Panel b illustrates a scanning electron microscope (SEM) image of the fabricated random metasurface phase mask, composed of randomly arranged silicon nitride nanoposts on a fused silica substrate. Panel c illustrates an experimental realization of high numerical aperture (NA) light focusing through the metasurface (NA=0.95).

As noted above, the disordered media (P variables) as known in the art need to be exhaustively determined via O(P) measurements. In the metasurfaces of the present disclosure, the disorder is specifically designed so that its exact characteristics are known, resulting in an a priori determined transmission matrix that can be utilized with only a few alignment steps. This concept can be implemented with a disorder-engineered metasurface, which exhibits additional unique features for complex wavefront engineering, such as an unprecedented optical memory effect range, excellent stability, and a tailorable angular scattering profile. As known to the person of ordinary skill in the art, a spatial light modulator is a device that imposes a spatially varying modulation on a beam of light. The SLM can, for example, be controlled electrically or optically.

Therefore, the present disclosure describes how to design and implement the entire input-output response of an optically disordered medium using a metasurface platform. The present disclosure also demonstrates the complex wavefront engineering in conjunction with the engineered 'randomness' which enables control over an unprecedentedly large number of input-output channels ($>10^{13}$; 5 orders of magnitude larger than the previous record) and offers optical focusing and imaging capabilities beyond those of conventional optics.

Complex wavefront engineering can be described as a class of methods that allow control of a very large number of optical degrees of freedom, ranging up to hundreds of thousands. This sets it apart from the regime of wavefront manipulation in adaptive optics where the corrections are typically performed for aberrations modeled by a relatively small number of Zernike orders. As a class of technologies, complex wavefront engineering is particularly well suited for applications involving disordered media. These applications can be broadly divided into two categories. In the first category, wavefront engineering works to overcome intrinsic limitations of the disordered media. Biological tissue is one such example where scattering is a problem, with complex wavefront engineering emerging as a solution to produce a shaped light beam that counteracts multiple scattering and enables imaging and focusing deep inside the tissue.

In the second category, disordered media are intentionally introduced in conjunction with wavefront engineering to unlock an optical space with spatial extent (x) and frequency content (ω) that is inaccessible using conventional optics. One of the first demonstrations of this ability was reported by Vellekoop in Ref [1], showing that the presence of a disordered medium (e.g. a scattering white paint layer) between a source and a desired focal plane can actually help render a sharper focus. In related efforts, researchers have also shown that complex wavefront engineering can make use of disordered media to couple propagating and evanescent modes, in turn enabling near-field focusing. Recently, there have been more extensive demonstrations combining disordered media with complex wavefront engineering to increase the flexibility of the optical system to, for example, significantly extend the volumetric range in which aberration-free focusing can be achieved.

Unfortunately, this class of methods is stymied by one challenge—the optical input-output response of the disordered medium needs to be exhaustively characterized before use. Fundamentally, characterizing P input-output relationships requires O(P) measurements. For most practical applications, P greater than $10^{12}$ is highly desired to enable high fidelity access to the expanded optical space enabled by the disordered media with wavefront engineering. Unfortunately, the time-consuming nature of the measurements and the intrinsic instability of the vast majority of disordered media have limited the ability to achieve high values of P. To date, the best P quantification that has been achieved is about $10^8$ with a measurement time of 40 seconds.

The present disclosure describes the use of a disorder-engineered metasurface in place of a conventional disordered medium. In the present disclosure, such disorder-engineered metasurface can be referred as a "disordered metasurface". The disordered metasurface, which is composed of a 2D array of nano-scatterers that can be designed and fabricated, provides the optical 'randomness' of conventional disordered media, but in a way that is fully known a priori. Through this approach, it is possible to reduce the system characterization to a simple alignment problem. In addition to eliminating the need for extensive characterization measurements, the disordered metasurface platform exhibits a wide optical memory effect range, excellent stability, and a tailorable angular scattering profile—properties that are highly desirable for complex wavefront engineering but that are missing from conventional disordered media. Using this disorder-engineered metasurface platform, it is possible to demonstrate full control over, for example, $P=1.1 \times 10^{13}$ input-output relationships after a simple alignment procedure. The present disclosure describes an exemplary system comprising a disordered metasurface for assisted focusing and imaging, that is capable of high NA focusing (NA of about 0.5) to about $2.2 \times 10^8$ points in a field of view (FOV) with a diameter of about 8 mm. In comparison, for the same FOV, a conventional optical system such as an objective lens can at most access one or two orders of magnitude less points.

An example of a conventional disordered medium is a layer having a thickness of several microns and made of zinc oxide particles, or a ground glass diffuser. This disordered medium has three-dimensional optical inhomogeneity (i.e. the thickness of the scattering medium is much larger than the optical wavelength). The disordered metasurface as described in the present disclosure is different from a conventional disordered medium as it is composed of a two-dimensional array of subwavelength scatterers of uniform height. These subwavelength scatterers are realized by dielectric nanoposts with a high refractive index contrast compared to the substrate's material, which act as truncated multimode waveguides supporting low quality factor Fabry-Perot resonances. Consequently, the metasurface platform exhibits useful properties for wavefront shaping such as high transmittance and a very large angular (tilt/tilt) correlation range due to the low angular sensitivity of the nanoposts' resonances.

The large transmittance and angular correlation range, which are typically coupled with the thickness and angular scattering profile of a scattering medium, are independent features in the metasurface platform. Moreover, the metasurface platform also offers excellent stability and the capability to tailor the light scattering profile. In some embodiments, the disordered metasurface, consisting of silicon nitride (SiNx) nanoposts on a fused silica substrate, imparts local and space-variant phase delays with high transmission for the designed wavelength of 532 nm. The person of ordinary skill in the art will understand that in other embodiments other wavelengths may be used to design the metasurface.

The relationship between the input and output optical fields traveling through a disordered medium can be generally expressed in discretized form as in:

$$E_o = TE_i, \quad (1)$$

where $E_i$ is the field vector at the input plane of the medium, $E_o$ is the field vector at the output projection plane behind the medium, and T is the transmission matrix connecting the input field vector $E_i$ with the output field vector $E_o$ on the other side of the disordered medium. In the context of addressable focal spots with disordered medium assisted wavefront shaping, $E_o$ is a desired focusing optical field, $E_i$ is the linear combination of independent optical modes controlled by the spatial light modulator (SLM), and T is the transmission matrix, where each element describes the amplitude and phase relationship between a given input mode and output focal spot. In this scenario, $E_i$ has a dimension of N, the number of degrees of freedom in the input field (i.e. the number of SLM pixels), $E_o$ has a dimension of M given by the number of addressable spots on the projection plane, and T is a matrix which connects the input and output fields with P elements, where P=M×N. It can be noted that the following concepts and results can be generalized to other applications (e.g. beam steering or optical vortex generation) simply by switching $E_o$ to an appropriate basis set.

One of the unique and most useful aspects of wavefront shaping with disordered media is that it allows access to a broader optical space in both spatial extent and spatial frequency content than the input optical field can conventionally access. For example, when an SLM is used alone, the generated optical field $E_i$ contains a limited range of spatial frequencies due to the large pixel pitch of the SLM ($v_x$ or $v_y \leq 1/(2d_{SLM})$ where $v_x$ and $v_y$ are spatial frequency contents along the transverse axes of the SLM and $d_{SLM}$ is the pixel pitch; typically ~10 µm). As a consequence, the number of addressable spots M is identical to the number of controllable degrees of freedom N. In contrast, when a disordered medium is placed in the optical path, its strongly scattering nature generates an output field $E_o$ with much higher spatial frequencies given by $\sqrt{v_x^2 + v_y^2} \leq 1/\lambda$, where $\lambda$ is the wavelength of the light. According to the space-bandwidth product formalism, this means that the number of addressable focal spots M within a given modulation area S is maximally improved to $$M = S \times \frac{\pi}{\lambda^2}. \quad (2)$$

The scheme for focusing with wavefront shaping assisted by a disordered medium can be understood as the process of combining N independent optical modes to constructively interfere at a desired position on the projection plane. In general, due to the increased spatial frequency range of the output field, the number of addressable spots M is much larger than the number of degrees of freedom in the input, N, and therefore the accessible focal spots on the output plane are not independent optical modes. Instead, because the transmission through the metasurface can be described as a linear transformation of N input basis vectors, the number of degrees of freedom at the output plane (i.e. the number of orthogonal patterns at the output plane) remains the same as at the input plane. More specifically, when the incident wavefronts for M different spots are transmitted through the metasurface, each focal spot exists on top of a background which contains the correlated contributions from the unoptimised optical modes in the output field, thus resulting in a maximum of N degrees of freedom at the output plane. Here the contrast η, the ratio between the intensity transmitted into the focal spot and the surrounding background, is dictated by the number of controlled optical modes in the input, N. In practical situations where, for instance, the addressable spots are used for imaging or photo-switching, the contrast η simply needs to be sufficiently high to ensure the energy leakage does not harmfully compromise the system performance. In such applications, the addressable spots can also be described as resolvable spots. Henceforth, it is possible to use these terms interchangeably, depending on whether the description refers to the physics or the specific imaging applications.

To maximize performance in imaging applications, it can be desirable to have as many resolvable spots as possible, each with high contrast. This means that both M and N, and in turn P, should be as high as possible. Practically, there are two ways to measure the elements of the transmission matrix—orthogonal input probing and output phase conjugation. In each case, an individual measurement corresponds to a single element in the transmission matrix and is accomplished by determining the field relationship between an input mode and a location on the projection plane. Both still necessitate O(P) measurements which, when P is large, leads to a prohibitively long measurement time. As a point of reference, if the fast transmission matrix characterization method reported in Ref [2] could be extended without complications, it would still require a measurement time of over 40 days to characterize a transmission matrix with $P=10^{13}$ elements. In comparison, the stability associated with most conventional disordered media is only several hours, as known to the person of ordinary skill in the art.

In contrast, the disordered metasurfaces described herein avoid the measurement problem altogether since all elements of the transmission matrix are known a priori. This means that now the procedure to calibrate the system is simplified from the O(P) measurements needed to determine the transmission matrix to the small number of steps required to align the disordered metasurface and the SLM.

Figure 2:
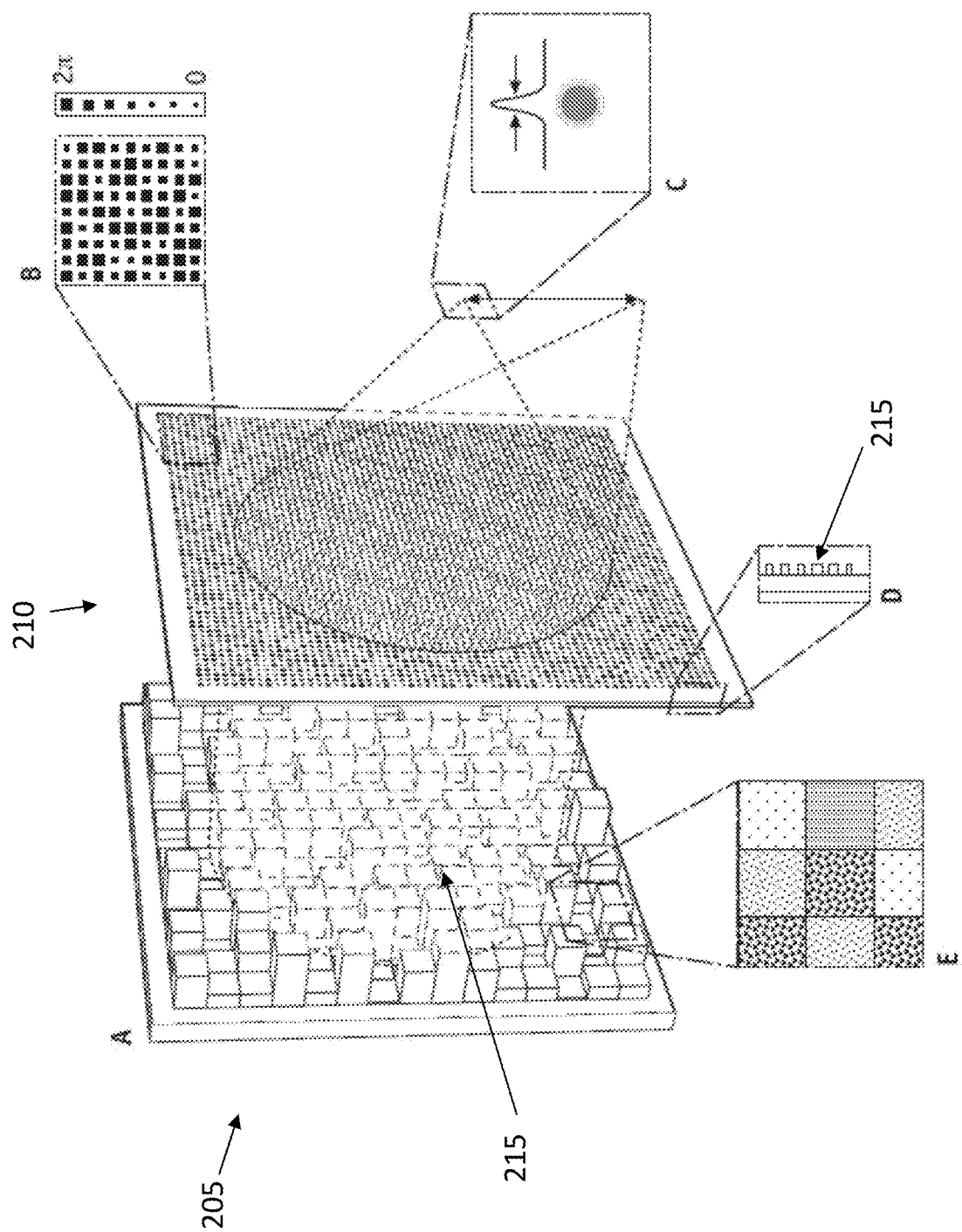
FIG. 2 illustrates wavefront shaping assisted by a disorder-engineered metasurface.

A schematic illustration of the technique is presented in FIG. 2 with the omission of a 4-f imaging system optically conjugating the SLM plane to the disordered metasurface. An SLM structures a collimated incident beam into an optimal wavefront, which in turn generates a desired complex output wavefront through the disordered metasurface. Since the transmission matrix is known a priori, the process of focusing to a desired location consists in a computation. The optimal incident pattern $E_i^{opt}$ that encodes the information for a target field $E_o^{target}$ is calculated using the concept of phase conjugation. This approach enables access to the maximum possible number of resolvable spots for wavefront shaping for a given modulation area S with the added benefit of control over the scattering properties of the metasurface.

Figure 3:
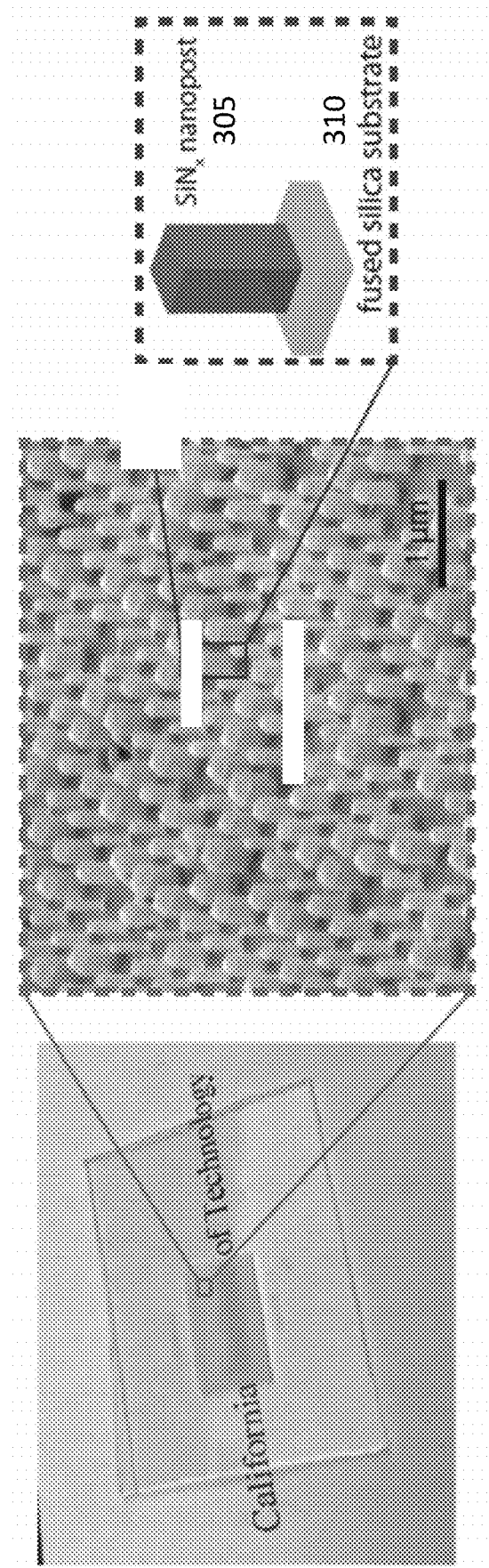
FIGS. 3-7 illustrate the characterization of disorder-engineered metasurfaces.

The disordered metasurface platform described in the present disclosure comprises subwavelength scatterers or meta-atoms arranged on a two-dimensional lattice to purposefully shape optical wavefronts with subwavelength resolution (FIG. 3). The disordered metasurface, in some embodiments, comprises silicon nitride ($SiN_x$) nanoposts on a fused silica substrate, and imparts local and space-variant phase delays with high transmission for the designed wavelength of 532 nm.

Figure 4:
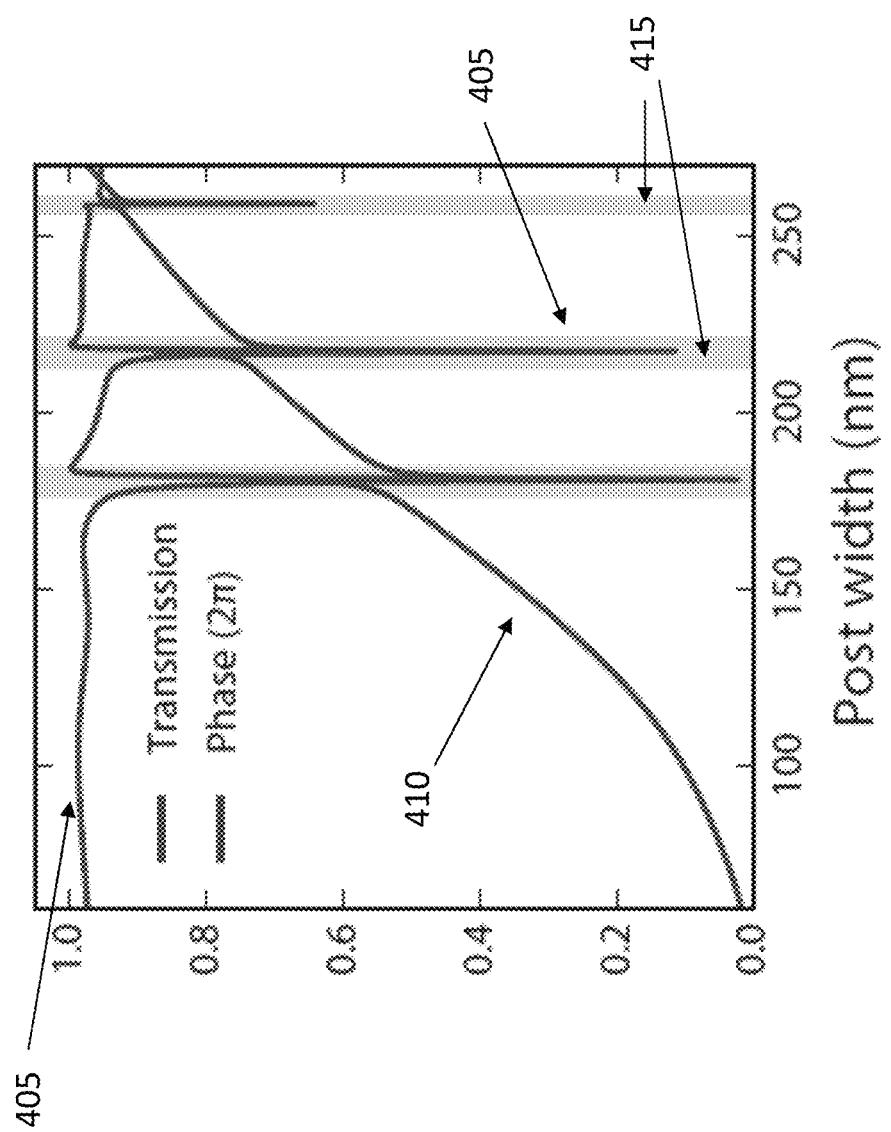
Figure 5:
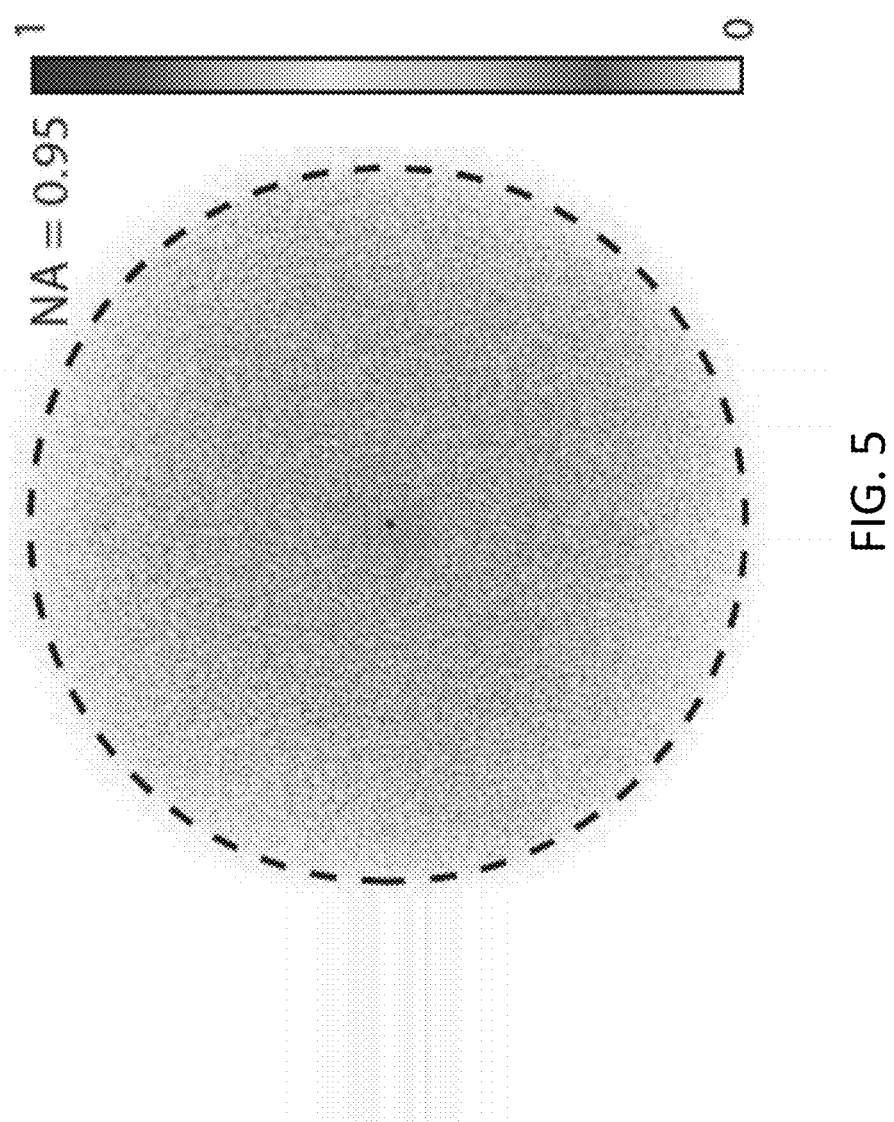

It is possible to constrain the design of the phase profile $\phi(x,y)$ of the metasurface in such a way that its angular scattering profile is isotropically distributed over the maximal possible spatial bandwidth of $1/\lambda$ in free space, and then choose the width of the individual nanoposts according to the look-up table shown in FIG. 4. The experimentally measured scattering profile confirms the nearly isotropic scattering property of the disordered metasurface, presenting a scattering profile that fully extends to the spatial frequency of $1/\lambda$ as shown in FIG. 5. The measured transmittance was approximately 50% regardless of the incident pattern. In contrast, it is known that conventional three-dimensional disordered media in the diffusive regime present fluctuations in transmittance, depending on the incident field, because the transmittances of its fundamental transmitting eigenchannels are distributed over a wide range. The disordered metasurface platform also allows the scattering profile to be tailored, which can be potentially useful in conjunction with angle-selective optical behaviors, such as total internal reflection. FIG. 5 presents the measured scattering profiles of disordered metasurfaces designed to have different angular scattering ranges, corresponding to NAs of 0.3, 0.6, and 0.9.

Figure 7:
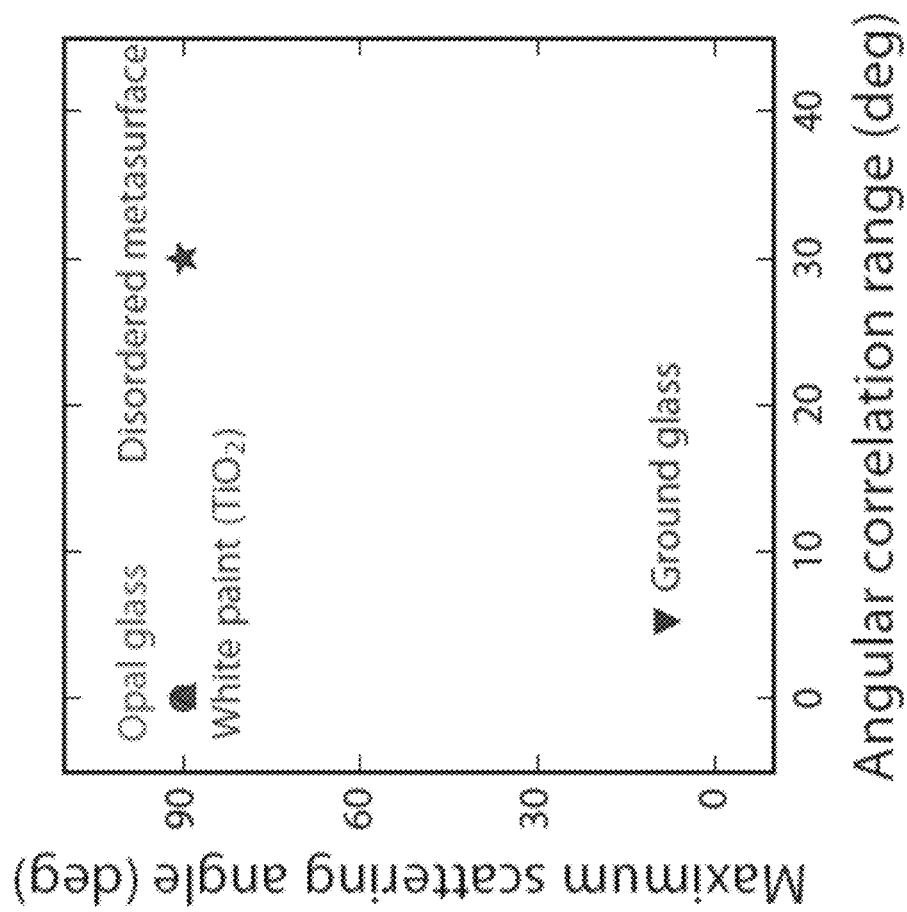

In addition to a highly isotropic scattering profile, a disordered metasurface also exhibits a very large angular (tilt/tilt) correlation range (also known as the optical memory effect). The correlation can be larger than 0.5 even up to a tilting angle of 30 degrees (FIG. 7). In conventional disordered media, the volumetric nature of the media makes it very difficult to achieve a wide angular scattering profile and a large memory effect at the same time due to the competing influence of the thickness of the scattering medium on both of these properties. In contrast, due to the low angular sensitivity of the nanoposts' resonances, the disordered metasurface described herein can simultaneously achieve a broad angular scattering profile and a wide memory effect range. For example, conventional scattering media commonly used for scattering lenses, such as opal glass and white paint layers with titanium dioxide ($TiO_2$) having a thickness of several microns, exhibit much narrower correlation ranges of less than 1 degree (FIG. 7).

Although ground glass diffusers present a relatively larger correlation range of ~5 degrees, their limited angular scattering range makes them less attractive for wavefront shaping. Moreover, the disordered metasurface described herein is extraordinarily stable due to its fixed, two-dimensional fabricated structure. It is, in fact, possible to retain the ability to generate a high quality optical focus from the same metasurface without observable efficiency loss over a period of 75 days by making only minor corrections to the system alignment to compensate for mechanical drift.

The wavefront manipulation technique described herein was experimentally tested in the context of focusing and imaging assisted by a disordered medium. The disordered metasurface was aligned to the SLM by displaying a known pattern on the SLM and correcting the shift and tilt of the metasurface to ensure high correlation between the computed and measured output fields. Subsequently, to demonstrate the flexibility of this approach, a converging spherical wave was reconstructed for a wide range of lateral and axial focus positions. FIGS. 20-23 illustrate the simplified schematic for optical focusing. Panels b1-b3 show the 2D intensity profiles for the foci reconstructed along the optical axis at $z'=1.4$, 2.1, and 3.8 mm, measured at their focal planes. The corresponding NAs are 0.95, 0.9, and 0.75, respectively. The full width at half maximum (FWHM) spot sizes of the reconstructed foci were 280, 330, 370 nm, which are nearly diffraction-limited as shown in panel c. The intensity profiles are highly symmetric, implying that the converging spherical wavefronts were reconstructed with high fidelity through the disordered metasurface. It is also remarkable that this technique can reliably control the high transverse wavevector components corresponding to an NA of 0.95, while the SLM used alone can control only those transverse wavevectors associated with an NA of 0.033, based on the Nyquist-Shannon sampling theorem. Each of panels b1-b6 corresponds, respectively, to points B1-B6 in the orthogonal directions of panel a.

Panels b4-b6 show the 2D intensity profiles at $x'=0$, 1, 4, and 7 mm on the fixed focal plane of $z'=3.8$ mm (corresponding to an on-axis NA of 0.75). Because the disordered metasurface based scattering lens is a singlet lens scheme, the spot size along the x-axis increased from 370 to 1500 nm as the focus was shifted (summarized in panel d).

The total number of resolvable spots achievable with the disordered metasurface, M, was estimated to be ~$4.3 \times 10^8$ based on the plot in panel d, exceeding the number of controlled degrees of freedom on the SLM (N~$10^5$) by over 3 orders of magnitude. This enables high-NA focusing over a large FOV without the mechanical scanning necessary using conventional objective lenses, demonstrating that the metasurface-assisted platform, as a fixed optical system, can access a wider optical space (represented by x and v) compared to conventional optics. For the disordered metasurface, an NA of ~0.5 was maintained in a lateral FOV with a diameter of ~8 mm, resulting in an estimated $2.2 \times 10^8$ resolvable focal spots. For the sake of comparison, a high-quality objective lens with an NA of 0.5 typically has ~$10^7$ resolvable spots, an order of magnitude smaller than the number of the spots demonstrated with the disordered metasurface described in the present disclosure. It can be noted that although the resolvable spots for the objective lens have the additional property of being independent, as long as the contrast $\eta$ is high enough to enable a sufficient signal-to-noise ratio, the number of resolvable spots is the appropriate metric of interest, regardless of whether or not they are independent.

With the disordered metasurface platform described in the present disclosure it is possible to control a transmission matrix with a number of elements P given by the product of the number of resolvable focal spots on the output plane and the number of controllable modes in the input. The P which can achieved with the system described herein was $1.1 \times 10^{13}$, which renders it possible to address an estimated ~$4.3 \times 10^8$ focal spots with a contrast factor $\eta$ of ~$2.5 \times 10^4$. This value of P is 5 orders of magnitude higher than what has previously been possible with techniques known to the person of ordinary skill in the art.

The present disclosure also describes how even with reduced control over the number of input modes, it is still possible to access the same number of addressable spots on the output projection plane, albeit with a reduced contrast. By binning pixels on the SLM, it is possible to reduce the number of controlled degrees of freedom on the SLM by up to three orders of magnitude, from ~$10^5$ to ~$10^2$. In this case, the capability of diffraction-limited focusing over a wide FOV is maintained. Although the same number of focal spots can be addressed, the contrast factor $\eta$ is sacrificed when the number of degrees of control is reduced. Using ~$10^2$ degrees of freedom in the input, it is possible to achieve a contrast factor of ~70. This validates that the complex wavefront manipulation technique described herein, as assisted by the disordered metasurface, can greatly improve the number of addressable focal spots for wavefront shaping regardless of the number of degrees of freedom in the input.

Figure 8:
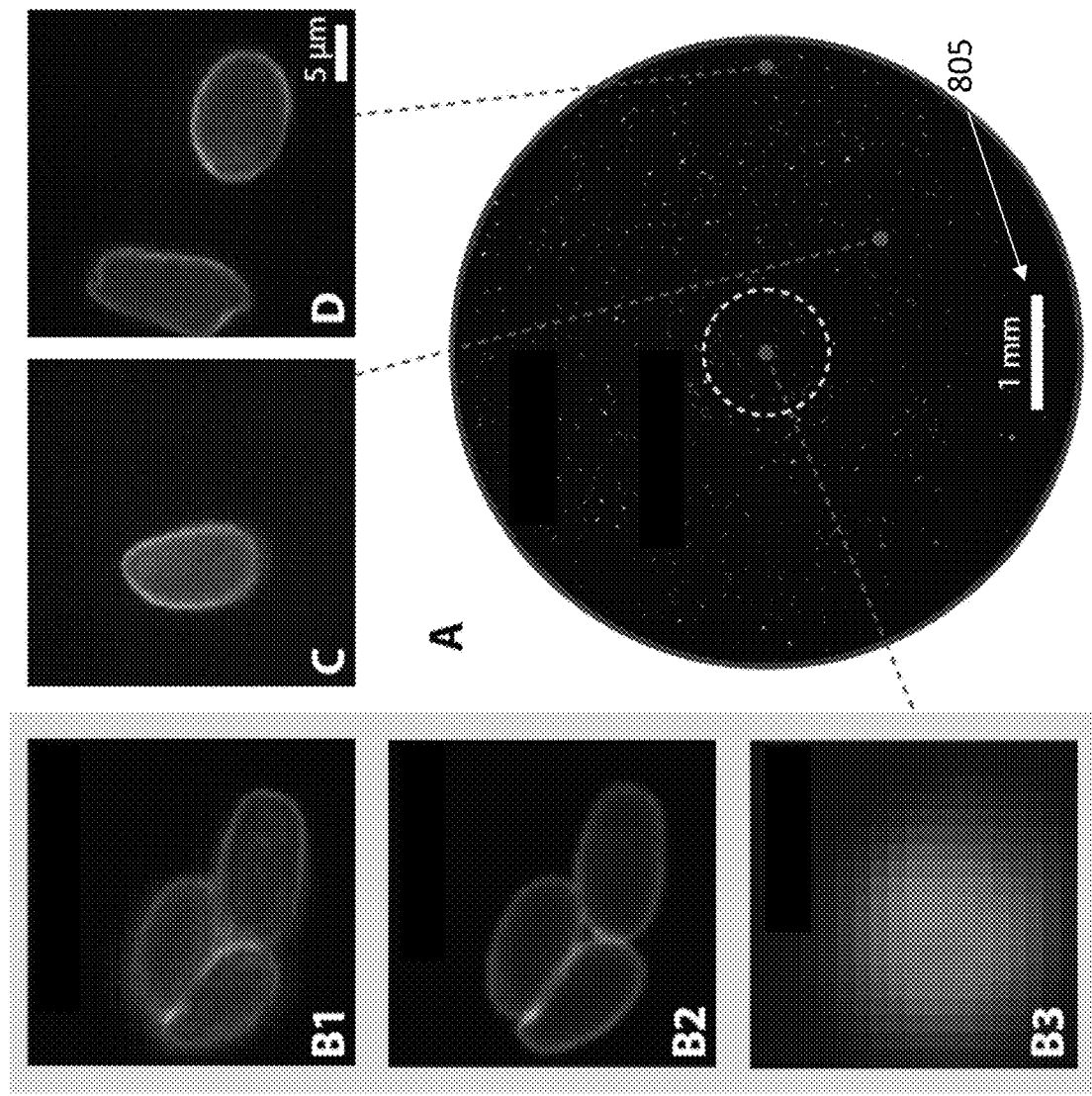
FIG. 8 illustrates a demonstration of disordered metasurface assisted microscope for high resolution wide-FOV fluorescence imaging of *giardia lamblia* cysts.

In some embodiments, it is possible to employ the metasurfaces of the present disclosure to implement a scanning fluorescence microscope for high-resolution, wide field of view (FOV) fluorescence imaging. FIG. 8 panel a illustrates the wide FOV, low-resolution fluorescence image of immunofluorescence-labeled parasites (*Giardia lamblia* cysts) captured through the 4× objective lens. As shown in the magnified view in FIG. 8 panel b3, a typical fluorescence image directly captured with the 4× objective lens was significantly blurred, so that the shape and number of parasites was not discernible from the image. FIG. 8 panels b1, c, and d show the fluorescence images obtained with a scanning microscope employing a metasurface. The scanned images resolve the fine features of parasites both near the center and the boundary of the 5-mm wide FOV (FIG. 8 panel d). The metasurface devices described herein provide the capability for high NA focusing (NA≈0.5) within a FOV with a diameter of ~8 mm, as shown in FIGS. 20-23. In addition, the large memory effect range of the metasurface allows the use of galvanometer mirrors to scan the focus without having to refresh the pattern displayed on the SLM, improving acquisition speed compared to using the SLM alone. To validate the performance of our imaging system, it is possible to compare it to conventional 20× and 4× objectives. The captured images in FIG. 8 demonstrate that it is possible to achieve the resolution of the 20× objective over the FOV of the 4× objective.

The present disclosure describes how to implement a disorder-engineered medium using a metasurface platform and demonstrated the benefit of using it for wavefront shaping. Allowing complete control of the transmission matrix a priori, the disorder-engineered metasurface fundamentally changes the way disordered media can be employed for wavefront shaping. By contrast, with other techniques known to the person of ordinary skill in the art, to control P input-output relationships through a disordered medium, O(P) calibration measurements were required. The disorder-engineered metasurface allows instead for a transmission matrix with P elements to be fully employed with only an alignment procedure.

The present disclosure described the reconstruction of spherical wavefronts. However, the method described herein is generally applicable to produce arbitrary wavefronts for applications such as beam steering, vector beam generation, multiple foci, or even random pattern generation. The large gain in the number of addressable optical focal spots (or equivalently angles or patterns) enabled by the method described herein can also be used to improve existing optical techniques such as fluorescence imaging, optical stimulation/lithography, free space coupling among photonic chips/optical networks, and optical encryption/decryption.

In the specific application of focal spot scanning, an embodiment of a metasurface system comprises two planar components, a metasurface phase mask and a conventional SLM. This system is highly scalable and versatile, bypassing the limitations and complexities of using conventional objective lenses. The scalability of the metasurface could be especially useful in achieving ultra-long working distances for high NA focusing. The scheme could also be implemented as a vertically integrated optical device together with electronics (e.g. a metasurface phase mask on top of a transmissive LCD), providing a compact and robust solution to render a large number of diffraction-limited spots. Furthermore, the concept is applicable over a wide range of the electromagnetic spectrum with the proper choice of low-loss materials for the meta-atoms. This system allows for multiplexing different colors, which is useful for multicolor fluorescence microscopy and multiphoton excitation microscopy. Possible materials for the nanoscatterers are $SiN_x$ or $TiO_2$ for the entire visible spectrum and Si for near infrared wavelengths. The planar design also provides a platform to potentially achieve ultra-high NA solid-immersion lenses or total internal reflection fluorescence (TIRF) excitation, suitable for super-resolution imaging and single-molecule biophysics experiments.

The ability to customize the design of the disordered metasurface for a particular application can be highly useful. For example, the scattering profile of the disordered metasurface can be tailored to act as an efficient spatial frequency mixer or to be exploited for novel optical detection strategies. The disordered metasurface can also serve as a collection lens, analogous to the results obtained for light manipulation, providing an enhanced resolving power and extended view field. Additionally, while the disordered metasurface described herein was designed to be insensitive to the polarization of the incident optical field, in other embodiments the metasurfaces can be designed independently for orthogonal polarization states, which provides additional avenues for control in wavefront shaping. Together, the engineering flexibility provided by these parameters offers unprecedented control over complex patterned illumination, which offers the potential to directly benefit emerging imaging methods that rely on complex structured illumination. The present disclosure describes the use of a disorder-engineered metasurface in wavefront shaping, challenging a prevailing view of the 'randomness' of disordered media by programmatically designing its 'randomness'.

FIG. 2 panel a illustrates a system setup consisting of two planar components, an SLM (205) and a disorder-engineered metasurface (210). Panel b illustrates how the disorder-engineered metasurface can be implemented by fabricating the nanoposts with varying sizes, which correspond to different phase delays $\phi(x,y)$ on the metasurface. Panel c illustrates the wide angular scattering range enables high NA focusing over a wide FOV. Panel d illustrates the thin, planar nature of the disordered metasurface yields a large memory effect range and also makes the transmission matrix of the metasurface extraordinarily stable. Panel e illustrates how the SLM enables reconfigurable control of the expanded optical space available through the disordered metasurface. It can be noted from panel d that the nanoscatterers (215) have the same height. In FIG. 2 panel a, the light beam transmitted between (205) and (210) is shown (215) as partly obfuscating the elements (with square cross section) illustrated as part of (205). These elements are illustrated as having a dashed outline. Panel e of FIG. 2 represents in different shading how the illustrated parallelepipeds have different heights.

Figure 6:
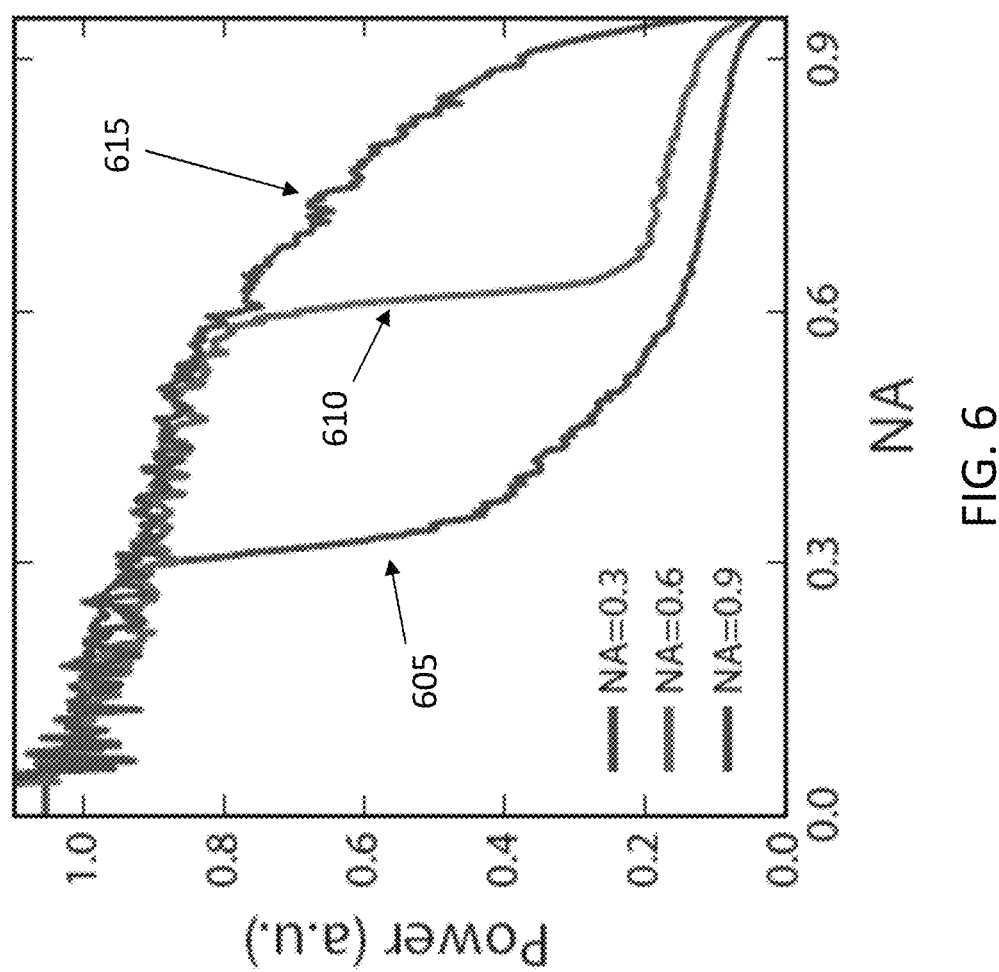

FIG. 3 illustrates a photograph and SEM image of a fabricated disorder-engineered metasurface, with nanoposts (305) on a silica substrate (310). FIG. 4 illustrates the simulated transmission (405) and phase (410) of the $SiN_x$ nanoposts as a function of their width at a wavelength of 532 nm. The data in FIG. 4 can used as a look-up table for the metasurface design. Similar graphs can be realized at other wavelengths and used to design metasurfaces. FIG. 5 illustrates the measured 2D angular scattering profile of the disordered metasurface, normalized to the strongest scattered field component. FIG. 6 illustrates the measured 1D angular scattering profile of the disordered metasurfaces that were specifically designed to scatter the incident light to certain angular ranges. Specifically, the curves refer to NA=0.3 (605), 0.6 (610), and 0.9 (615). FIG. 7 illustrates the memory effect range and angular scattering range of the disordered metasurface compared with conventional random media such as white paint, opal glass, and ground glass diffusers.

FIG. 8 panel a illustrates a low resolution bright field image captured by a conventional fluorescence microscope with a 4× objective lens (NA=0.1). The scale bar (805) is 1 mm. FIG. 8 panels b1, b2 and b3 illustrate fluorescence images captured at the center of the FOV. FIG. 8 panel b1 illustrates a scanned image obtained with a disordered metasurface lens. FIG. 8 panel b2 illustrates the ground truth fluorescence image captured with a 20× objective lens (NA=0.5). FIG. 8 panel b3 illustrates a magnified low-resolution fluorescence image captured with the 4× objective. FIG. 8 panels c and d illustrate images obtained with the disorder metasurface-assisted microscope at (x, y)=(1, 1) and (2.5, 0) mm, respectively. FIG. 8 demonstrates that it is possible to use the system for high resolution and wide FOV imaging.

Figure 9:
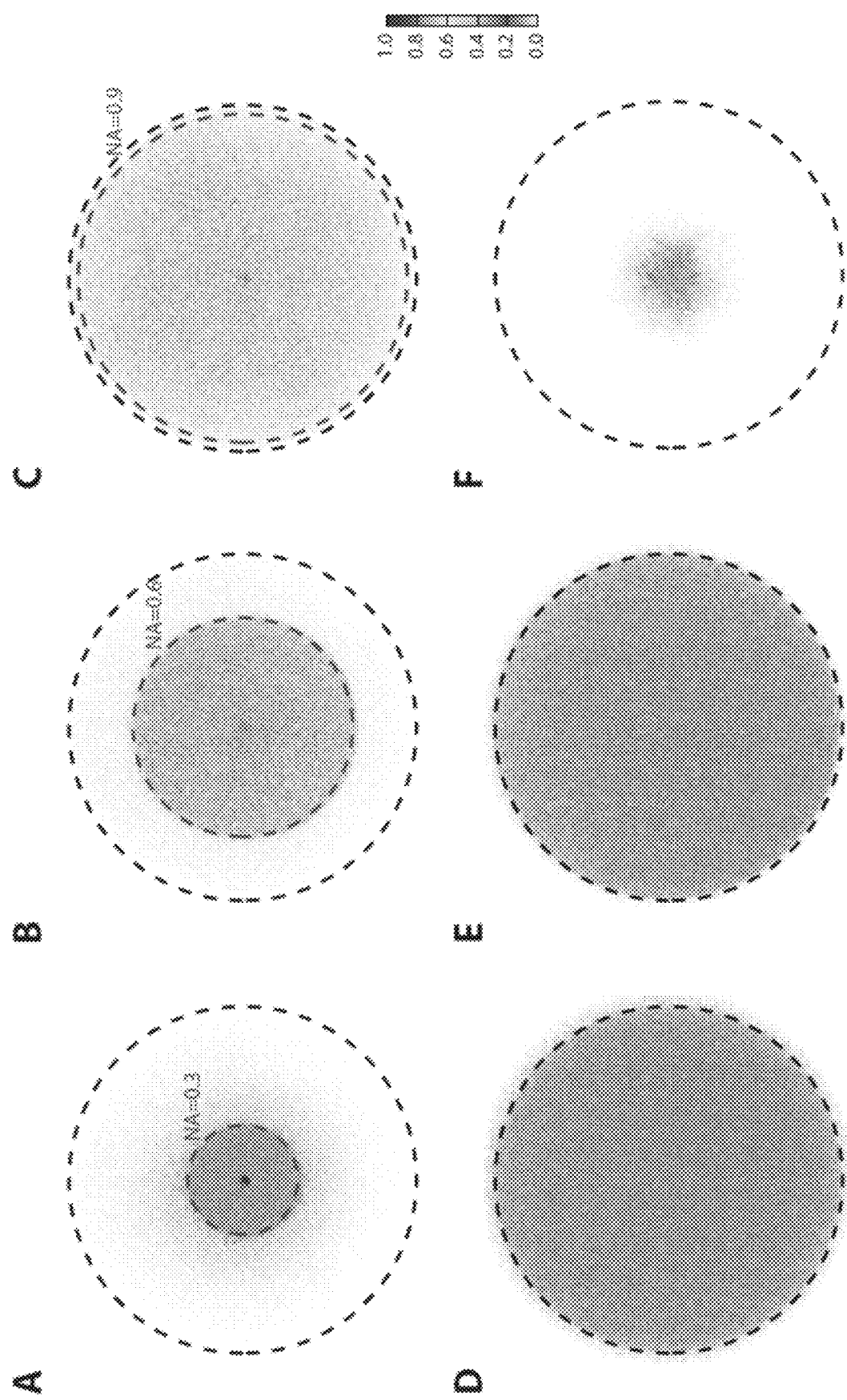
FIG. 9 illustrates measured angular scattering profiles of disordered metasurfaces as well as those of conventional disordered media.

In FIG. 9, a collimated laser beam illuminated the scattering media and a 4-f system imaged the back focal plane of an objective lens (NA=0.95) to a camera. Panels a to c illustrate angular scattering profiles of disordered metasurfaces with different designs, normalized to strongest scattered field component. The disordered metasurfaces were specifically designed so that they scatter the incident light to certain angular ranges of: panel a, NA=0.3, panel b, NA=0.6, panel c, NA=0.9. Panels d to f illustrate angular scattering profiles of conventional scattering media. Panel d relates to the 20-μm-thick white paint (made of $TiO_2$ nanoparticles) and panel e to the opal glass diffuser; both show isotropic scattering over the wide angular ranges, while panel f relates to the ground glass diffuser and has a very limited angular range for scattering. The dotted lines delimiting each circle correspond to the cutoff frequencies of the objective lens (NA=0.95), which is the limit in the measurement setup used.

Figure 10:
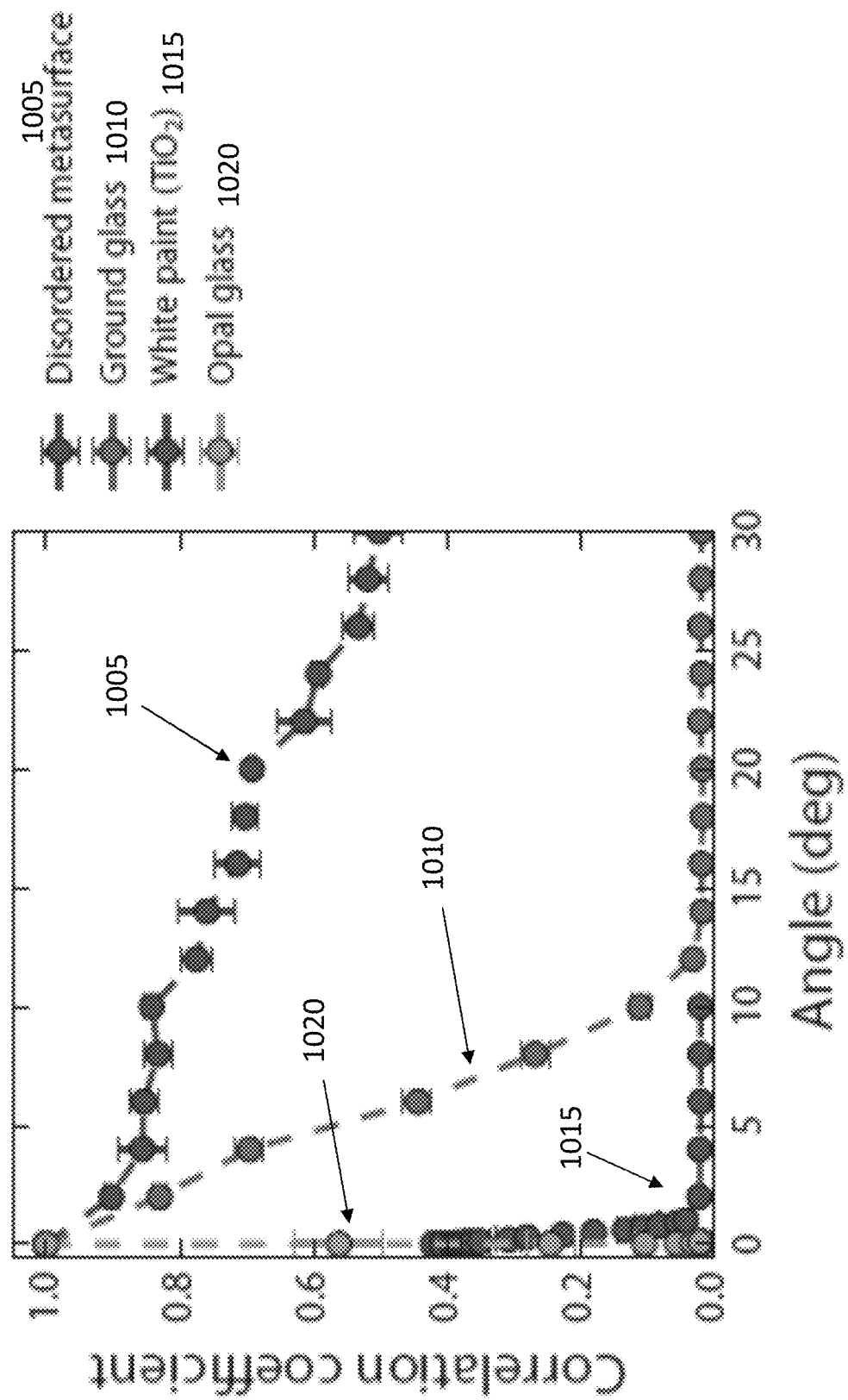
FIG. 10 illustrates an optical memory effect measurement.

FIG. 10 illustrates the measured memory effect ranges for the disordered metasurface (1005), ground glass (1010), opal glass (1020), and 20-μm-thick white paint made with $TiO_2$ nanoparticles (1015).

Figure 11:
FIG. 11 illustrates the extraordinary stability of a disordered metasurface.
Figure 11:
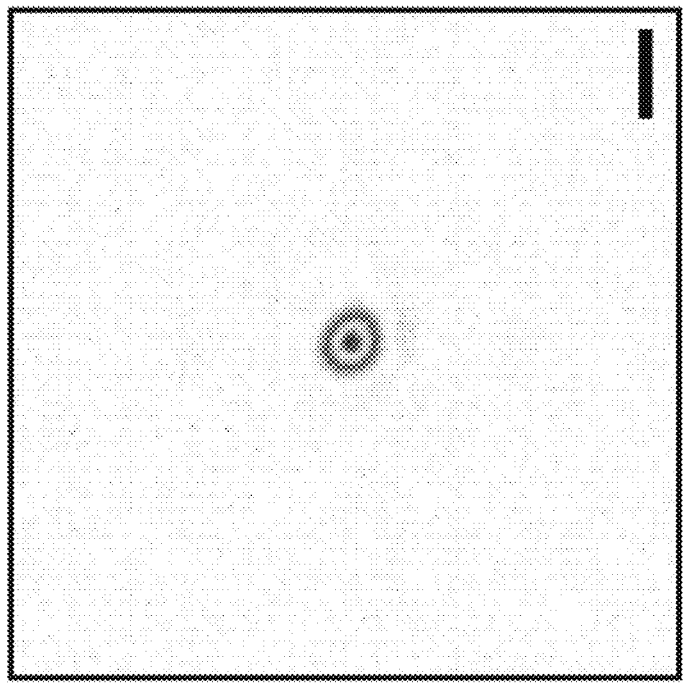
Figure 11:
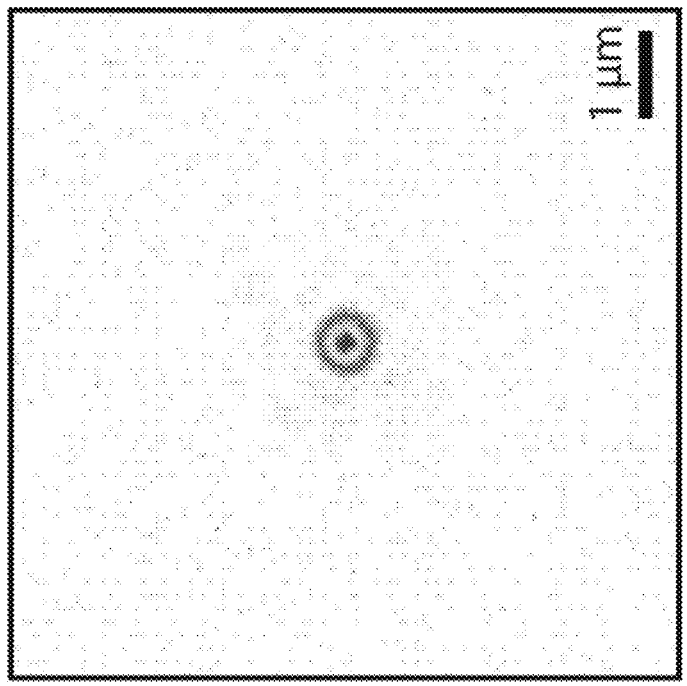
Figure 12:
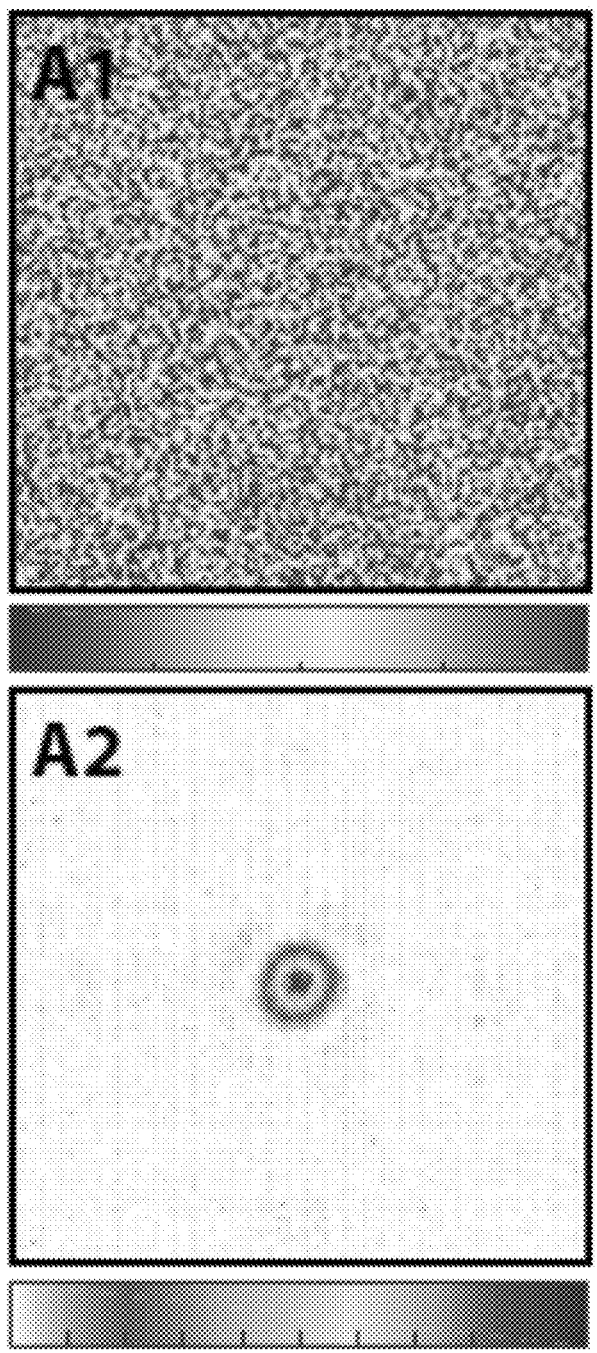
FIGS. 12-15 illustrate a demonstration of ultra-high number of resolvable spots M even with a handful of physically controlled degrees of freedom as inputs.
Figure 13:
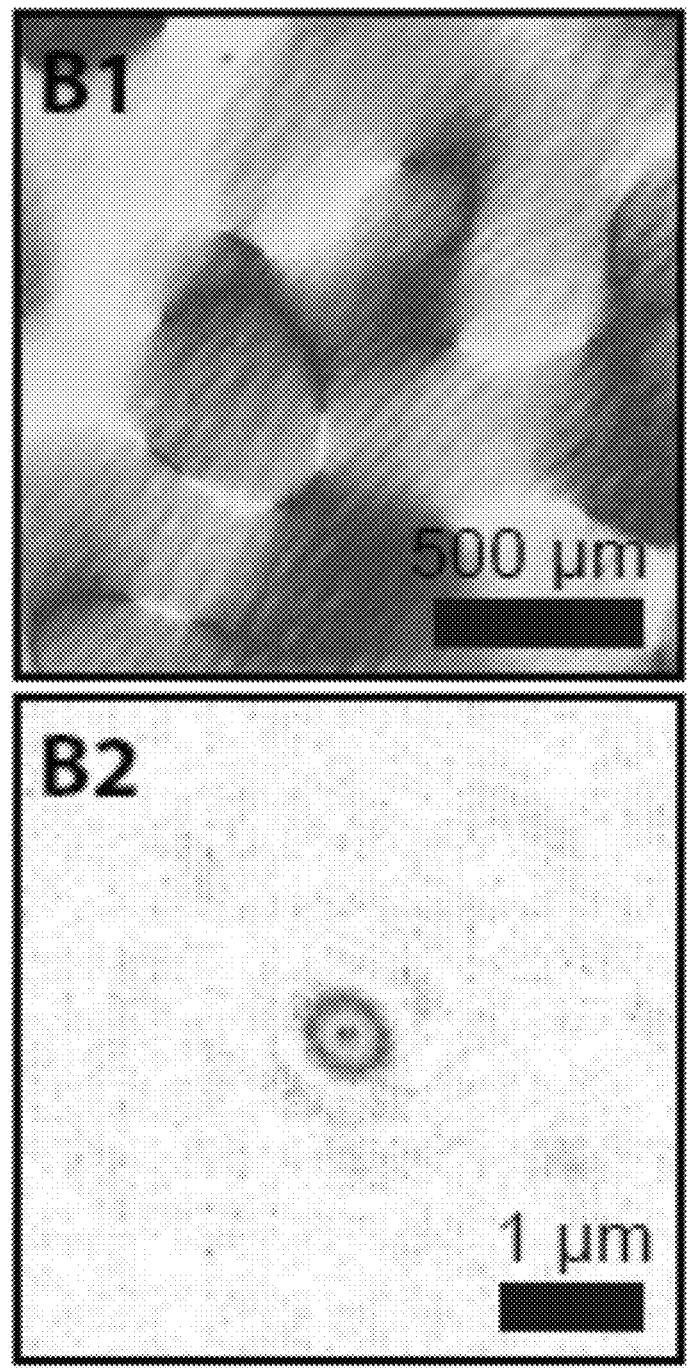

FIG. 11 illustrates how, over a period of 75 days, a high quality optical focus was obtained from the same metasurface without observable efficiency loss by small system alignments to compensate for mechanical drift. Panel a illustrates the reconstructed focus on the 1st day. The measured contrast was 19,800. Panel b illustrates the reconstructed focus on the 75th day. The measured contrast was 21,500. Scale bar: 1 μm for both panels.

Figure 14:
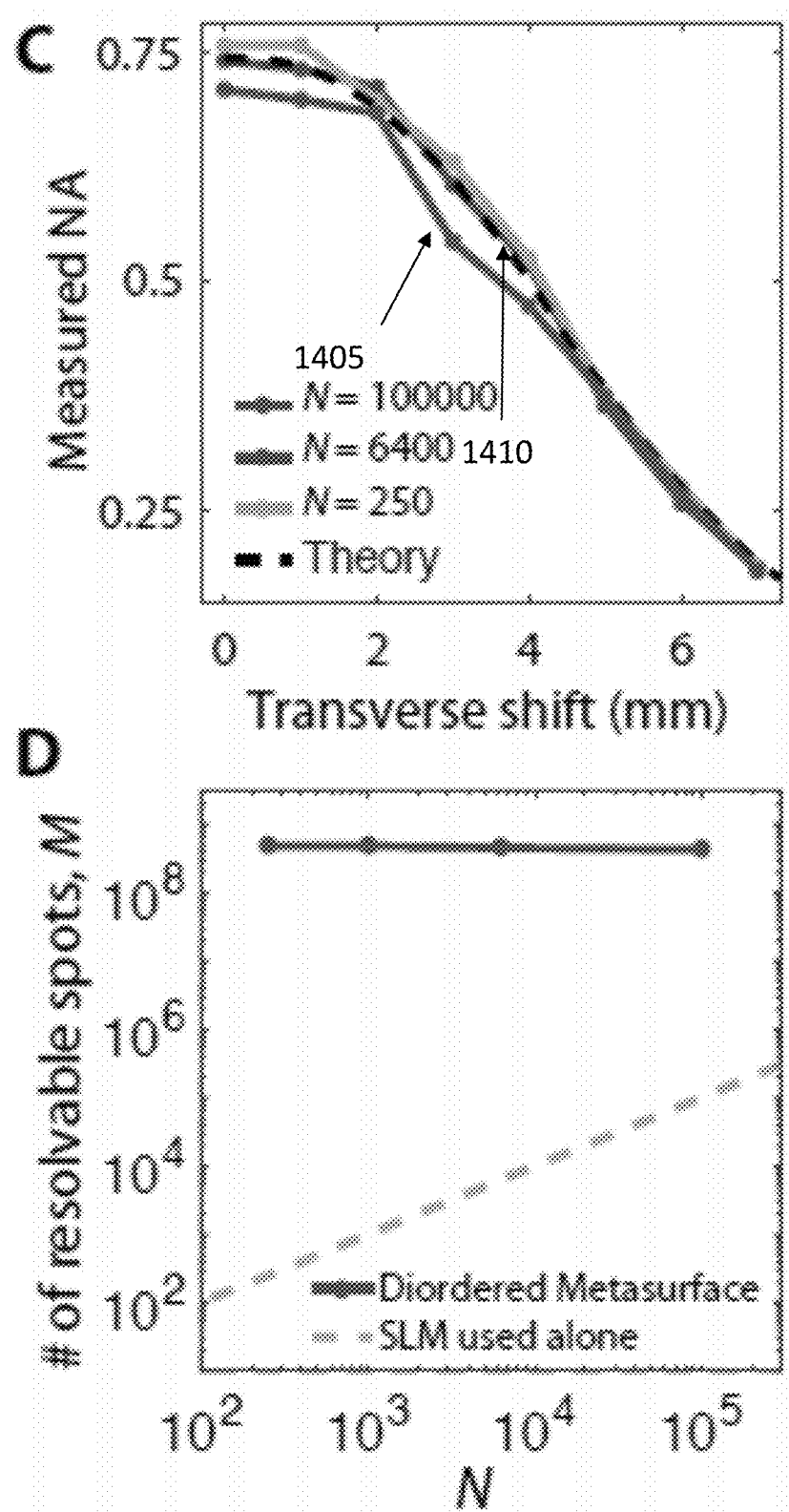
Figure 15:
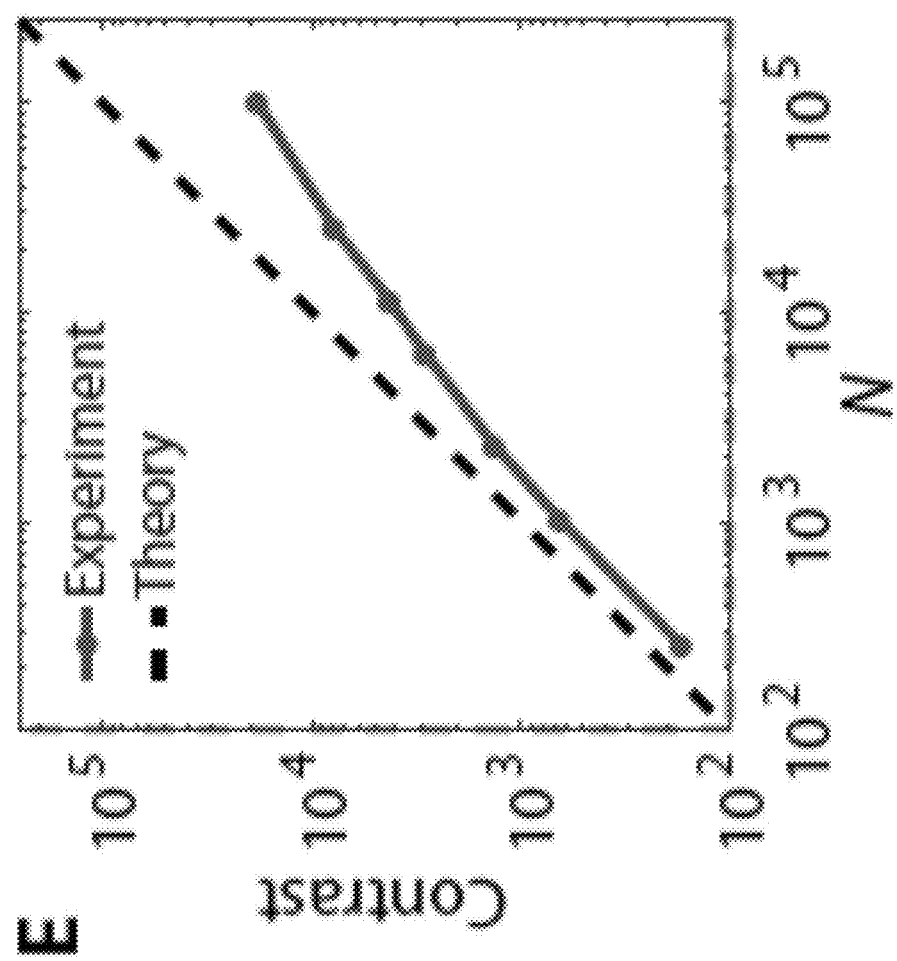

FIGS. 12-15 illustrate a demonstration of ultra-high number of resolvable spots M (~$4.5 \times 10^8$) even with a handful of physically controlled degrees of freedom (~$2.5 \times 10^2$) as inputs. Panels a1-2, b1-2 illustrate cropped phase images displayed on the SLM (a1, b1) as well as the corresponding 2D intensity profiles (a2, b2) of the foci reconstructed at z'=3.8 mm on axis (NA=0.75). The controlled number of input optical modes displayed SLM was (a1) $1.0 \times 10^5$ and (b1) $2.5 \times 10^2$, respectively. Scale bars for the phase images and the 2D intensity profiles are 500 μm and 1 μm, respectively. Panel c illustrates the measured NA of the foci created along x-axis. The measured NA shows good agreement with theory, regardless of the number of input modes controlled on the SLM. Panel d illustrates the measured number of resolvable spots M as a function of the number of optical modes N controlled on the SLM. Panel e illustrates the dependence of contrast factor η on the number of optical modes controlled on the SLM. FIG. 14 references data for N=100000 (1405) and 6400 (1410).

Figure 16:
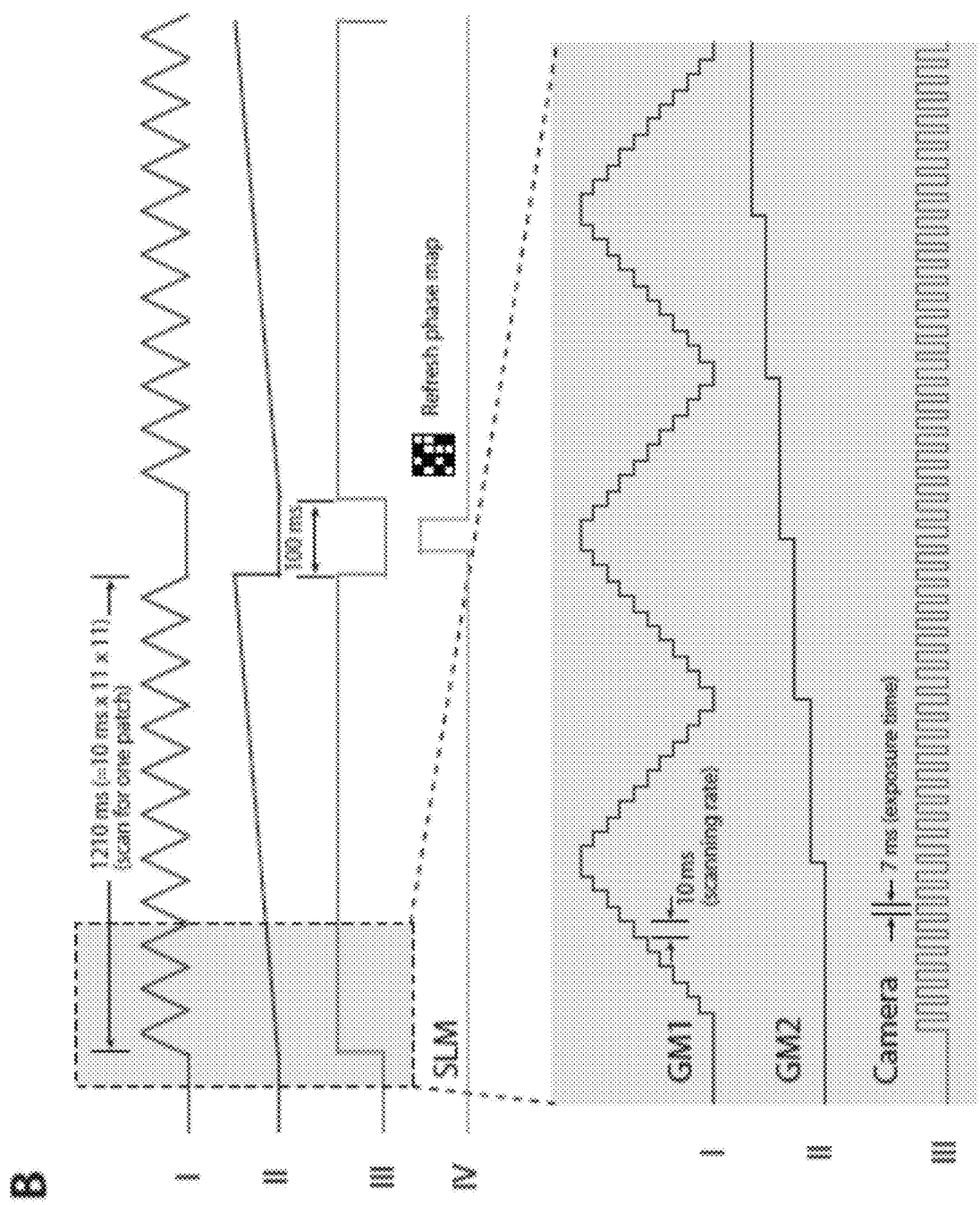
FIG. 16 illustrates data for scanning fluorescence imaging.

FIG. 16 illustrates data for an electrical signal flow diagram for scanning fluorescence imaging. A data acquisition card (DAQ) outputted voltage stepping signals to a pair of galvanometric mirrors (GM1 and GM2) to perform bi-directional raster scanning with a pixel dwell time of 10 ms. At the same time, the DAQ outputted a synchronized trigger signal with a 7 ms duration (corresponding to the exposure time) to a camera for detecting fluorescent signals. After one patch of 11×11 spots were scanned by the galvanometric mirrors, the galvanometric mirrors returned to the original position. During a 100 ms period, the phase map for correcting coma aberration was updated on a spatial light modulator (SLM). Then, the raster scanning by the galvanometric mirrors was resumed again to constitute another patch.

Figure 17:
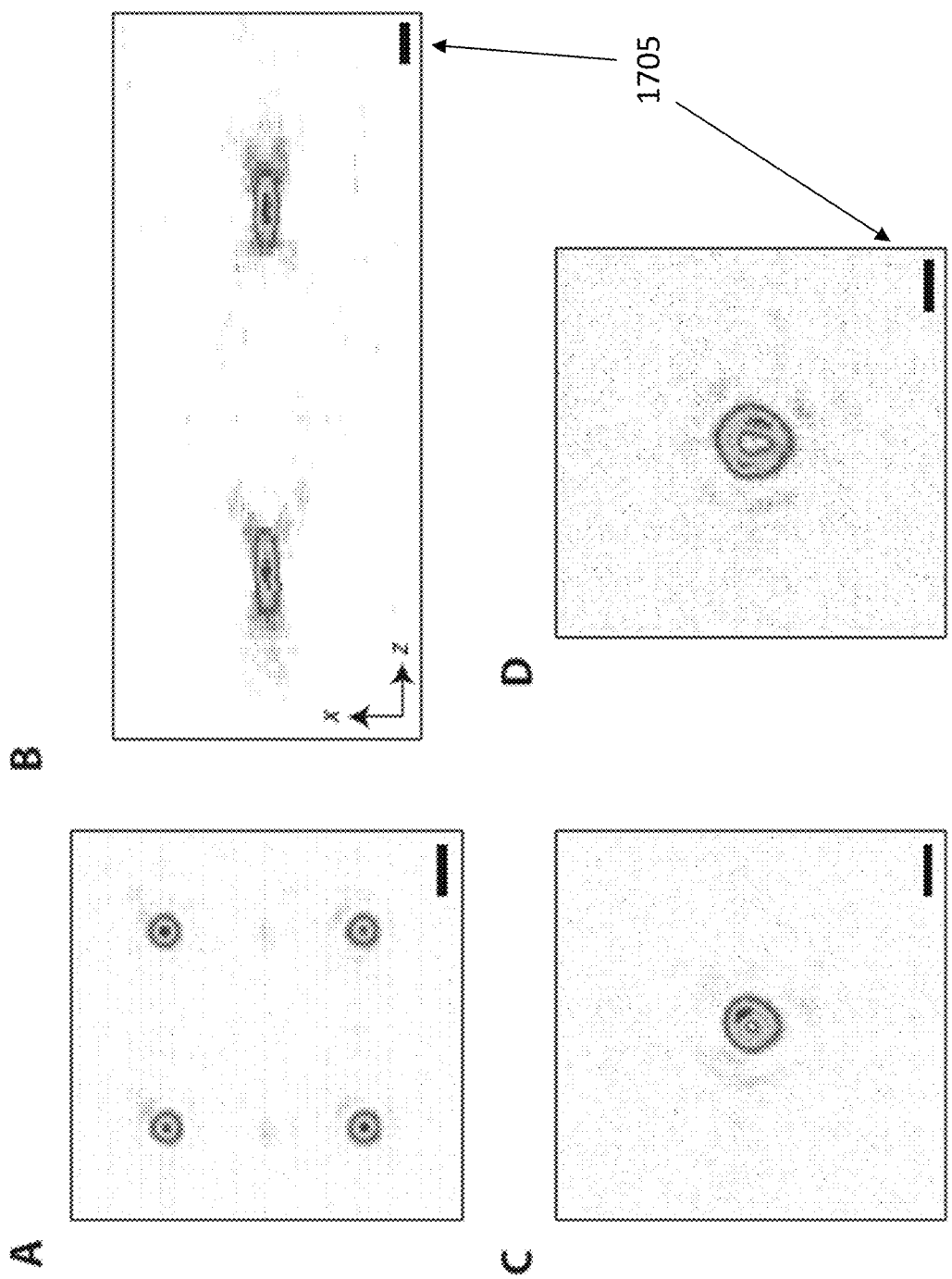
FIGS. 17-18 illustrate a demonstration of arbitrary complex wavefront modulation with a disordered metasurface.
Figure 18:
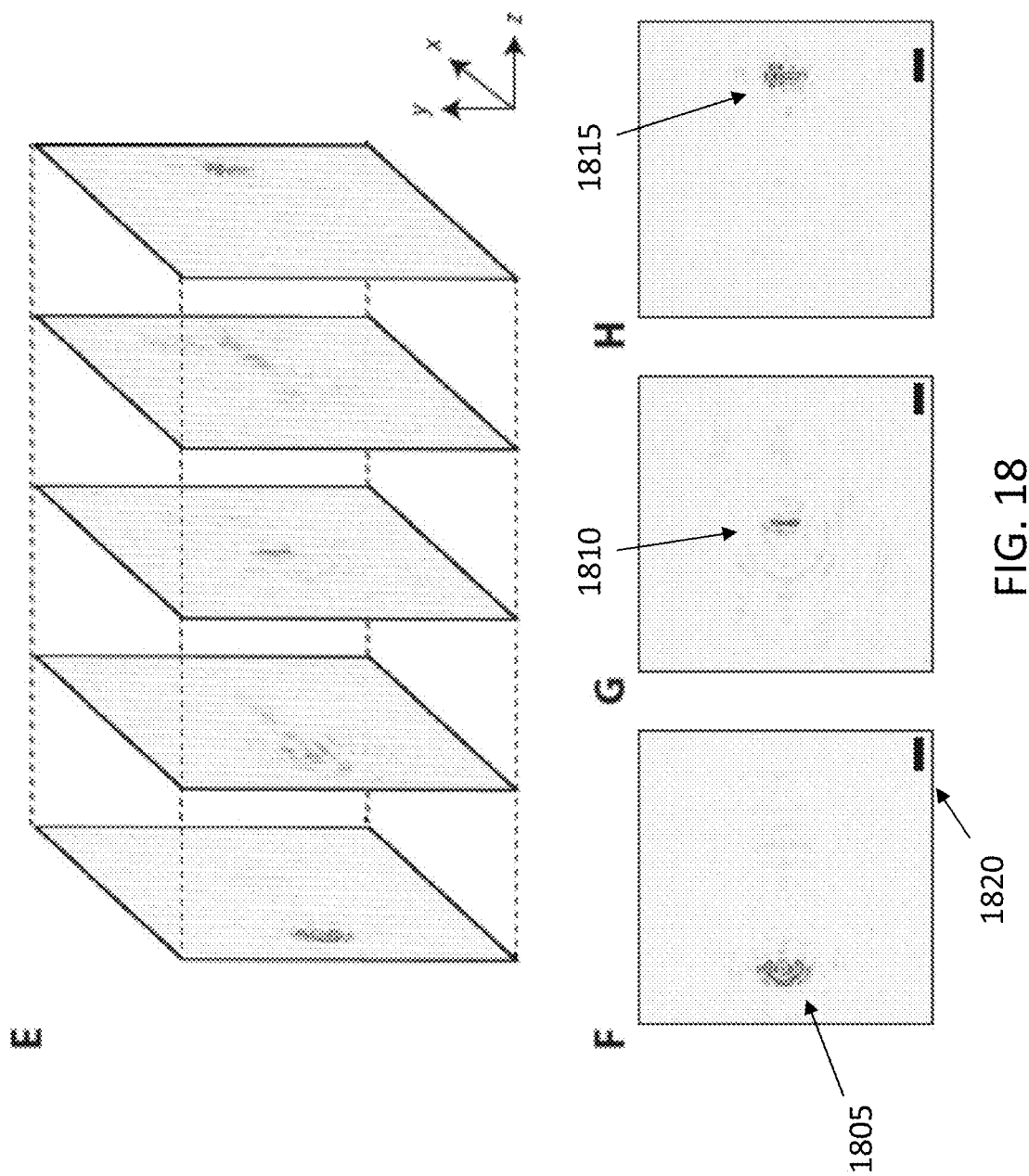

FIGS. 17-18 illustrate a demonstration of arbitrary complex wavefront modulation with a disordered metasurface. Panels a and b illustrate the simultaneous generation of multiple foci. All scale bars in FIG. 17, such as (1705), represent 1 μm. In FIG. 17, panel a illustrates four foci on a 4 μm pitch grid were reconstructed simultaneously along the lateral axes. Panel b illustrates two foci separated by 10 μm were reconstructed simultaneously along the optical axis. Panels c and d illustrate optical vortex focusing with topology charges of (c) m=1 and (d) m=2. In FIG. 18, panels e to h illustrate a 3D display using letters 'C' (1805), 'I' (1810), and 'T' (1815), placed at (panel f) z=−10 μm, (panel g) 0 μm, and (panel h) 10 μm. All scale bars in FIG. 18, such as (1820), represent 2 μm.

Figure 19:
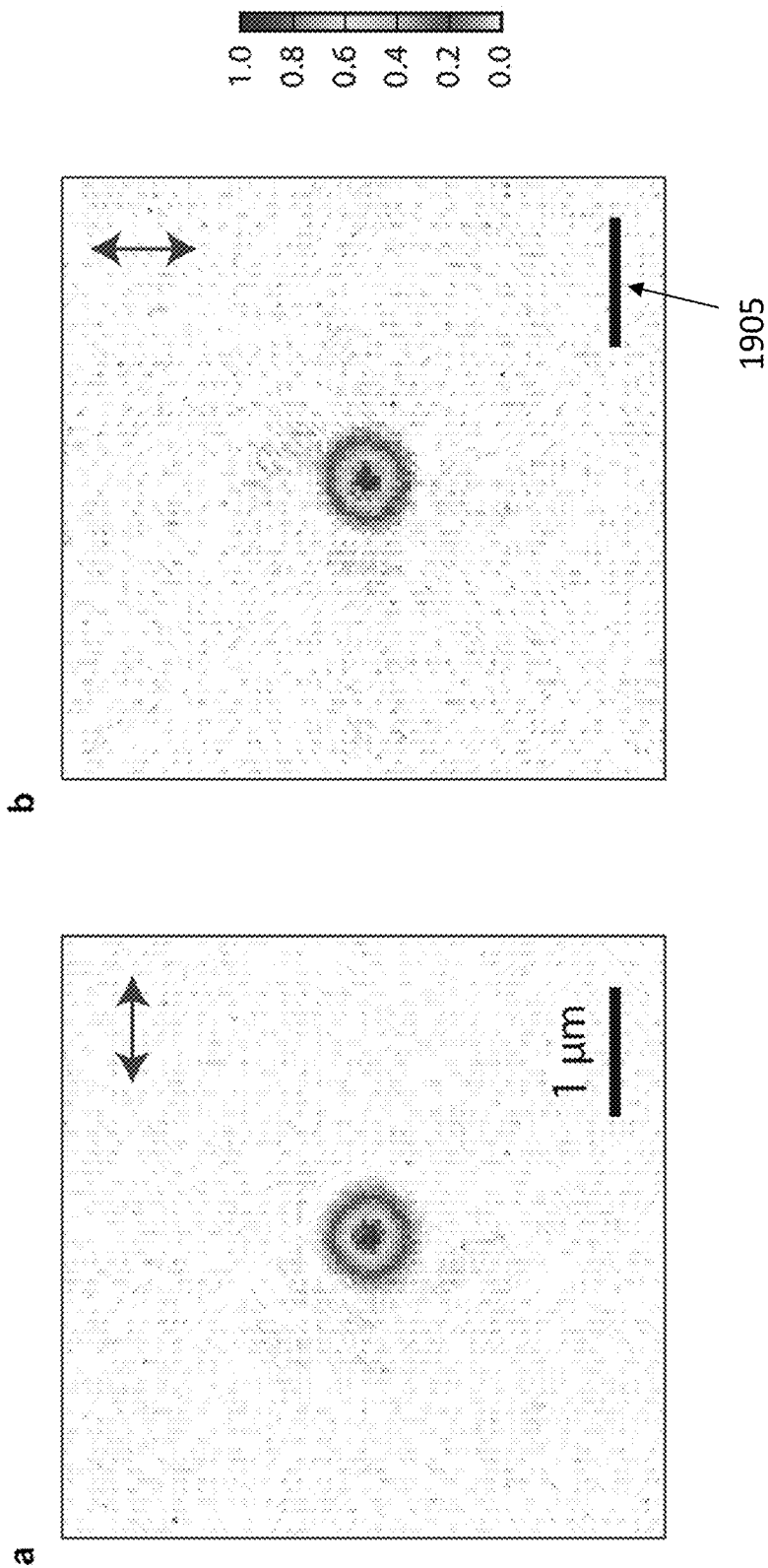
FIG. 19 illustrates a demonstration of polarization insensitivity of a disordered metasurface.

FIG. 19 illustrates a demonstration of polarization insensitivity of a disordered metasurface. Due to the symmetry of the lateral size of the nano-posts, the disordered metasurface can be insensitive to the incident polarization state. FIG. 19 shows foci with (panel a) horizontal and (panel b) vertical linear polarizations. All scale bars in FIG. 19, such as (1905), represent 1 μm.

Figure 20:
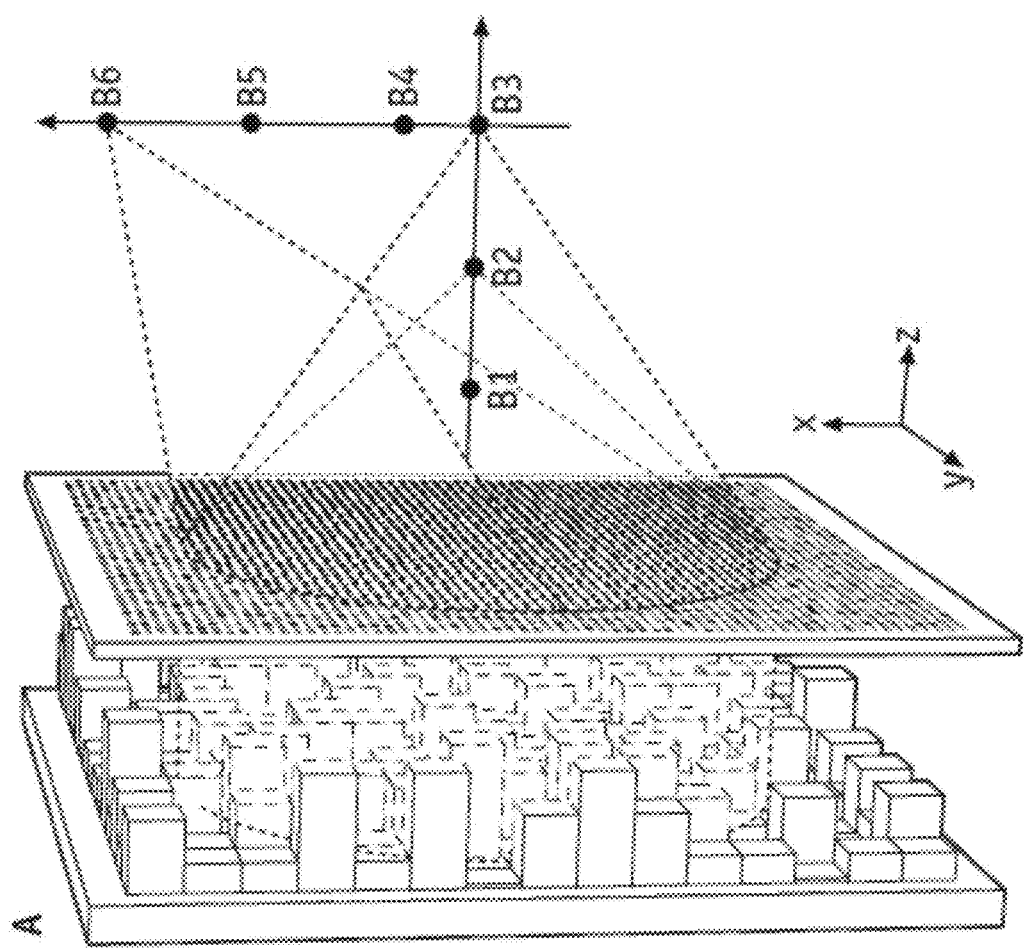
FIGS. 20-23 illustrate an experimental demonstration of diffraction-limited focusing over an extended volume.
Figure 21:
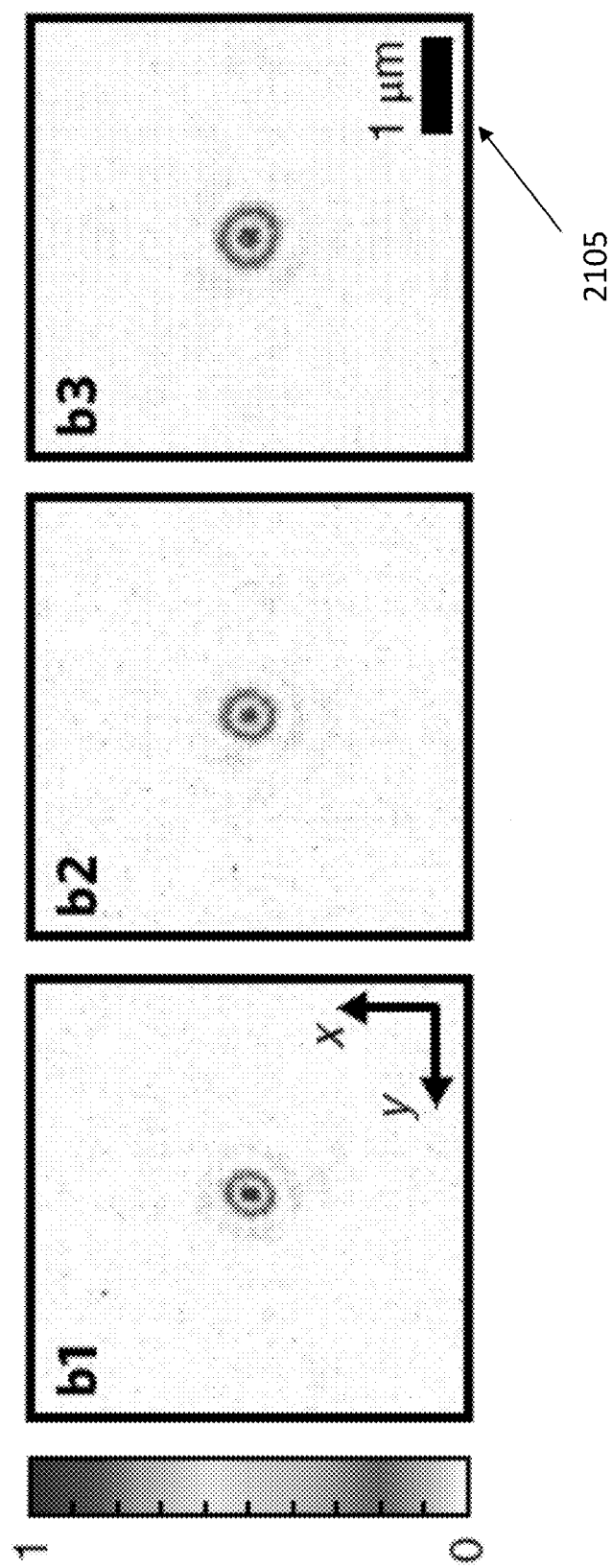
Figure 22:
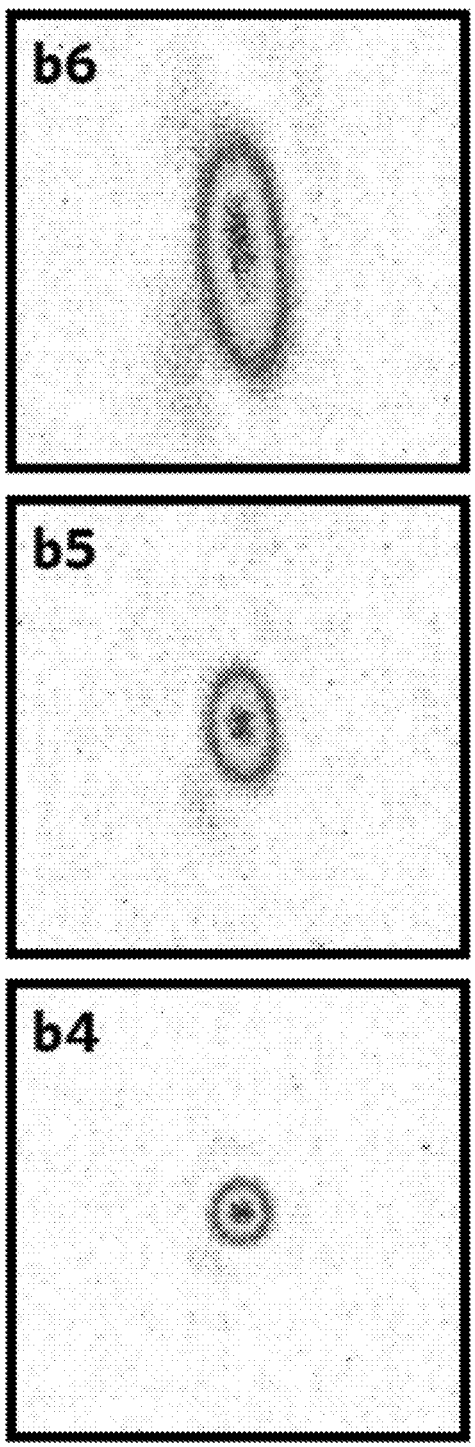
Figure 23:
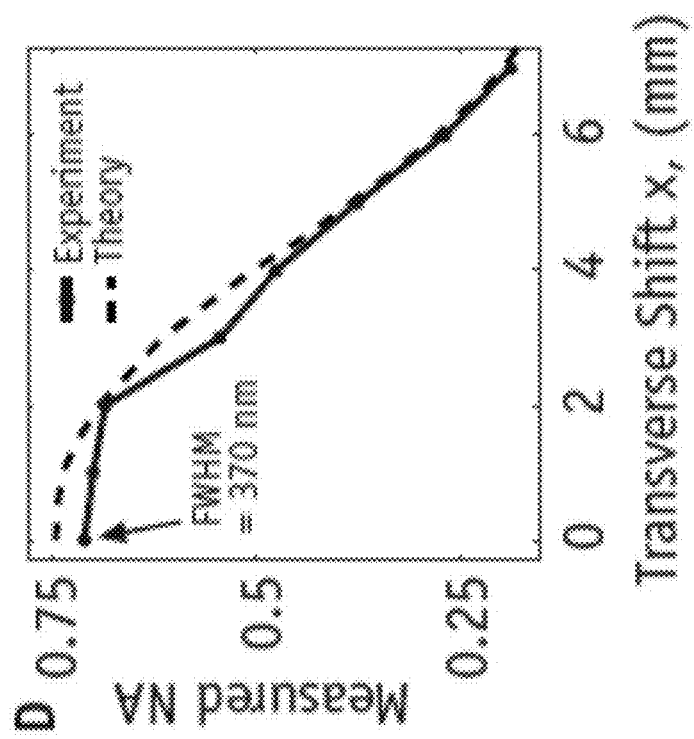
Figure 23:
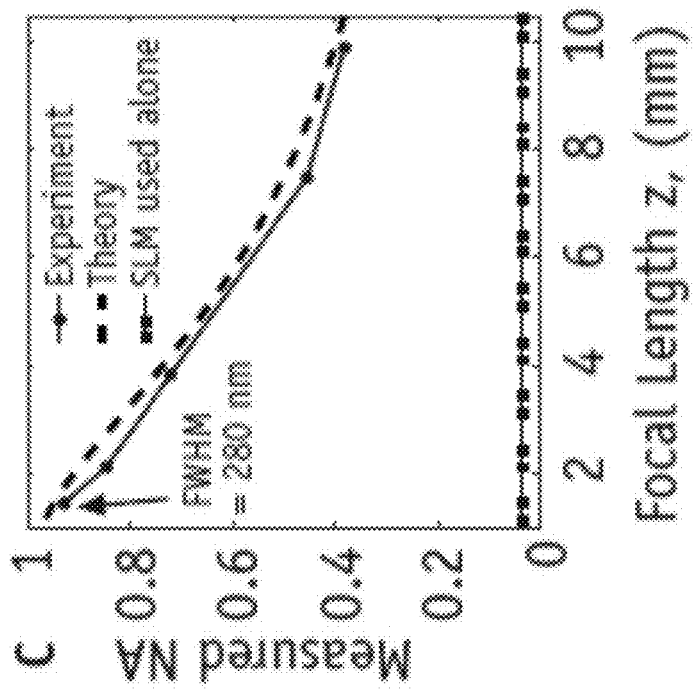

FIGS. 20-23 illustrate an experimental demonstration of diffraction-limited focusing over an extended volume. In FIG. 20, panel a illustrates a schematic of optical focusing assisted by the disordered metasurface. The incident light is polarized along the x direction. FIGS. 21-22 illustrates panels b1-b6, each respectively corresponding to points B1-B6 in panel a of FIG. 20. Panels b1-b6 illustrate the measured 2D intensity profiles for the foci reconstructed at the positions indicated in panel a. B1-B3 are the foci along the optical axis at z=1.4, 2.1, and 3.8, mm, respectively, corresponding to NAs of 0.95, 0.9, and 0.75. B3-B6 are the foci at x=0, 1, 4, and 7 mm scanned on the fixed focal plane of z=3.8 mm. The scale bar (2105) applies to both FIGS. 21 and 22, and represents 1 μm. In FIG. 23, panel c illustrates the measured NA (along x-axis) of the foci created along the optical axis (red solid line) compared with theoretical values (black dotted line). When the SLM is used alone, the maximum accessible NA is 0.033 (orange dotted line), based on the Nyquist-Shannon sampling theorem. (d) Measured NA (along x-axis) of the foci created along x axis at z=3.8 mm (experiment) compared with theoretical values (theory). The number of resolvable focusing points within the 14-mm diameter FOV was estimated to be $4.3 \times 10^8$.

In some embodiments, the disordered metasurface consist of silicon nitride ($SiN_x$) nanoposts arranged on a subwavelength square lattice with a periodicity of 350 nm as shown in FIG. 3. The width of each $SiN_x$ nanopost was precisely controlled within a range from 60 nm to 275 nm, correspondingly imparting local and space-variant phase delays covering a full range of 2π with close to unity transmittance for an incident wavefront at the design wavelength of 532 nm (FIG. 4). The widths of the nanoposts corresponding to the grayed regions (415) in FIG. 4 correspond to high quality factor resonances and are excluded in the design of the disordered metasurface. The phase profile $\phi(x,y)$ of the disordered metasurface was designed to yield an isotropic scattering profile over the desired angular range using the Gerchberg-Saxton (GS) algorithm. The initial phase profile of the far-field was randomly chosen from a uniform distribution between 0 and $2\pi$ radians. After several iterations, the phase profile converged such that the far-field pattern had isotropic scattering over the target angular ranges. This approach helps to minimize undiffracted light and evenly distribute the input energy over the whole angular range.

An exemplary method of fabrication for the metasurfaces is described in the following. A $SiN_x$ thin film of 630 nm was deposited using plasma enhanced chemical vapor deposition (PECVD) on a fused silica substrate. The metasurface pattern was first defined in a positive resist using an electron beam lithography system. After developing the resist, the pattern was transferred onto a 60 nm-thick aluminum oxide ($Al_2O_3$) layer deposited by electron beam evaporation using the lift-off technique. The patterned $Al_2O_3$ served as a hard mask for the dry etching of the 630 nm-thick $SiN_x$ layer in a mixture of $C_4F_8$ and $SF_6$ plasma and was then removed by a mixture of ammonium hydroxide and hydrogen peroxide at 80° C.

An exemplary method of alignment for the metasurfaces is described in the following. The alignment procedure consisted of two steps to ensure the proper mapping of the SLM pixels onto the intended coordinates of the disordered metasurface. Cross-shaped markers engraved at the four corners of the metasurface were used to guide rough alignment. Then, the marginal misalignments (e.g. translation and tip-tilt) and aberrations induced by the 4-f system were corrected. For this purpose, a collimated laser beam was tuned to be incident on the metasurface and the resulting field was measured with phase shifting holography. The residual misalignments and aberrations were then calibrated by comparing the measured complex field with the calculated one and digitally compensating for the misalignment by adding appropriate correction patterns on the SLM.

An exemplary method of computing a transmission matrix for optical focusing for the metasurfaces is described in the following. The transmission matrix model in the experiments describes the amplitude and phase relationship between each controllable input mode, given as each SLM pixel, and each desired focusing optical field. The calculation of T was carried out in a row by row manner, based on the intrinsic phase profile of the disordered metasurface $\phi(x, y)$. Setting the position of the focal spot corresponding to m-th row vector as $r_m' = (x_m', y_m', z')$, the converging spherical wavefront on the plane of metasurface is given as:

$$S_m(x, y) = \exp\left[-i\frac{2\pi}{\lambda}\sqrt{(x - x_m')^2 + (y - y_m')^2 + z'^2}\right], \quad (3)$$

where z' is the focal length. Then, the corresponding input field on the plane of metasurface was simply given as the product of the spherical wavefront $S_m(x, y)$ and the transmission phase profile of the disordered metasurface:

$$E_m^{meta}(x,y) = S_m(x,y) \times \exp(i\phi(x,y)). \quad (4)$$

Next, to calculate the input field on the plane of SLM that corresponds to the input field on the plane of metasurface $E_m^{meta}(x, y)$, a low-pass spatial frequency filter $\mathcal{L}$ was applied to $E_m^{meta}(x, y)$ using a fast Fourier transform algorithm:

$$E_m^{SLM}(x,y) = \mathcal{L}[E_m^{meta}(x,y)]. \quad (5)$$

Finally, $E_m^{SLM}(x, y)$ was sampled at positions corresponding to N SLM pixels for discretization, yielding N matrix elements. That is, the discretized complex field composes a row of the transmission matrix T that relates all controllable input modes to a given focal spot on the projection plane.

The optimal incident field $E_i^{opt}$ that reconstructs the target field $E_o^{target}$ (either of a single spot or a pattern composed of multiple spots) was calculated using $$E_i^{opt} = T^\dagger E_o^{target} \quad (6)$$

where $\dagger$ represents the conjugate transpose. In the actual experiment, an SLM was used for phase-only reconstruction of the optimal field $E_i^{opt}$ within a circular aperture with a 4.3 mm radius. In order to measure the focal spot, a custom-built microscope setup was used, consisting of a 100× objective lens with an NA of 0.95, a tube lens, and a charge coupled device (CCD) camera.

An exemplary method of scanning fluorescence imaging for the metasurfaces is described in the following. For the collection of the scanned fluorescent signal, an imaging system consisting of a 4× objective lens and tube lens was used to cover most of the FOV of the scanning microscope. The focal spot created behind the metasurface across the region of interest was scanned with a 10 ms pixel dwell time. A pair of galvanometric mirrors were used to scan a 2×2 µm patch with a step size of 200 nm, and the neighboring patches were successively scanned by adding a compensation map on the SLM to correct coma aberrations, instead of exhaustively calculating and refreshing the $E_i^{opt}$ for every spot. Each image in FIGS. 4b-4d consists of 15×15 patches. The fluorescence signal was detected by the sCMOS camera with an exposure time of 7 ms. The fluorescence signal was extracted from the camera pixels corresponding to the scanned focus position. The imaging time for a 30×30 µm² area was 5 min, which can be improved by two orders of magnitude using a high-power laser and resonant scanning mirrors.

An exemplary method of Immunofluorescence-labeled sample preparation is described in the following. As a biological sample, microscopic parasites were used, Giardia lamblia cysts. Before labeling the Giardia, the sample of $10^5$ Giardia was prepared in 10 µL phosphate buffered solution (PBS) in a centrifuge tube, then 1 µg of Giardia lamblia cysts antibody were inserted in 100 µL PBS, and 2 µg of Goat anti-Mouse IgG (H+L) Secondary Antibody conjugated with Alexa Fluor® 532 fluorescent dye in 100 µL of PBS. The sample was incubated with a blocking buffer. After the blocking buffer was removed, the sample was again incubated with the Giardia antibody solution. The sample was rinsed twice with PBS to remove the Giardia antibody solution. The sample was then incubated with the secondary antibody solution with fluorescent dye. Finally, the sample was rinsed twice with PBS to remove the secondary antibody solution. All incubations were carried out for 30 min at 37° C. The sample in 10 µL PBS was prepared on a slide with Prolong® Gold antifade reagent with DAPI (4',6-diamidino-2-phenylindole) to protect the labeled sample from fading and covered with a coverslip.

In some embodiments, phase only spatial light modulators can be realized, for example, with electrically tunable birefringence materials such as uniaxial liquid crystals. SLMs have the ability to manipulate the spatial full field information (i.e. amplitude and phase) of a light beam. Phase only SLM can be used, for example, to only control the phase of an incident light beam. In some embodiments, the width of each scattering element of the array is chosen according to a transmission matrix of the disordered metasurface. The transmission matrix comprises information on how the metasurface transmits incident light. For example, the transmission matrix can comprise information on the amplitude and phase of the output beam. In some embodiments, the nanoscatterers each have a width less than 900 nm, or less than 200 nm, or less than 100 nm. In some embodiments, the nanoscatterers do not have a uniform height, but have different heights. A uniform height can help simplify the fabrication process, however a metasurface may also be fabricated with nanoscatterers having a non-uniform heights. In some embodiments, non uniform heights can be a design choice, in that a designer may choose to design the post so that each post has a specific width and a specific height. In other words, the height as well as the width of the nanoposts may be selected according to the desired transmission matrix. Therefore, the height of the nanoposts may be varied for each post as an additional means for altering the optical phase retardation associated with each post.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] I. M. Vellekoop, A. Lagendijk, A. P. Mosk, Exploiting disorder for perfect focusing. *Nat. Photonics.* 4, 320-322 (2010).
[2] Y. Choi, T. D. Yang, C. Fang-Yen, P. Kang, K. J. Lee, R. R. Dasari, M. S. Feld, W. Choi, Overcoming the diffraction limit using multiple light scattering in a highly disordered medium. *Phys. Rev. Lett.* 107, 1-4 (2011).
[3] A. Arbabi, Y. Horie, A. J. Ball, M. Bagheri, and A. Faraon, "Subwavelength-thick lenses with high numerical apertures and large efficiency based on high-contrast transmitarrays," *Nat. Commun.*, 6, 1-6 (2015).
[4] A. Arbabi, Y. Horie, M. Bagheri, and A. Faraon, "Dielectric metasurfaces for complete control of phase and polarization with subwavelength spatial resolution and high transmission," *Nat. Nanotechnol.*, 10(11), 937-943 (2015).

What is claimed is:
1. A structure comprising:
a spatial light modulator; and
a disordered metasurface comprising an array of randomly arranged scattering elements, each scattering element of the array having a width smaller than a wavelength of an incident electromagnetic wave at which the structure is designed to operate, wherein the disordered metasurface is backed with the spatial light modulator.

2. The structure of claim 1, wherein the disordered metasurface has a numerical aperture of 0.5 or greater and is configured to focus at least $2.2 \times 10^8$ points in a field of view with a diameter of 8 mm.

3. The structure of claim 1, wherein the spatial light modulator is phase-only.

4. The structure of claim 1, wherein the array of scattering elements comprises an array of silicon nitride nanoposts on a fused silica substrate.

5. The structure of claim 1, wherein the disordered metasurface is configured to have an angular scattering profile isotropically distributed over a maximal possible spatial bandwidth of $1/\lambda$ in free space, where $\lambda$ is the wavelength of the incident electromagnetic wave.

6. The structure of claim 4, wherein the silicon nitride nanoposts have a square cross section.

7. The structure of claim 1, wherein the array of scattering elements comprises nanoposts having varying widths.

8. The structure of claim 1, wherein the width of each scattering element of the array is chosen according to a transmission matrix of the disordered metasurface.

9. The structure of claim 8, wherein the transmission matrix comprises an amplitude and phase of the incident electromagnetic wave after transmission by the disordered metasurface.

10. The structure of claim 1, wherein the array of scattering elements comprises an array of dielectric nanoposts on a substrate.

11. The structure of claim 10, wherein the dielectric nanoposts have a refractive index higher than a refractive index of the substrate.

12. The structure of claim 11, wherein the dielectric nanoposts are configured to act as truncated multimode waveguides supporting low quality factor Fabry-Perot resonances.

13. The structure of claim 1, wherein the scattering elements of the array have a uniform height.

14. A method comprising:
randomly arranging on a substrate an array of dielectric scattering elements having a varying width, the varying width chosen according to a desired transmission matrix, thereby fabricating a disordered metasurface; and
arranging a spatial light modulator as a backing to the disordered metasurface.

15. The method of claim 14, wherein the transmission matrix comprises an amplitude and phase of the incident electromagnetic wave after transmission by the disordered metasurface.

16. The method of claim 14, wherein the disordered metasurface has a numerical aperture of 0.5 or greater and is configured to focus at least $2.2 \times 10^8$ points in a field of view with a diameter of 8 mm.

17. The method of claim 14, wherein the array of scattering elements comprises an array of silicon nitride nanoposts on a fused silica substrate.

18. The method of claim 14, wherein the dielectric scattering elements of the array have a refractive index higher than a refractive index of the substrate.

19. The method of claim 14, wherein the scattering elements of the array have a uniform height.

* * * * *